(12) United States Patent
Picken et al.

(10) Patent No.: US 9,760,579 B2
(45) Date of Patent: *Sep. 12, 2017

(54) FILE CLONING AND DE-CLONING IN A DATA STORAGE SYSTEM

(71) Applicant: HITACHI DATA SYSTEMS ENGINEERING UK LIMITED, Bracknell, Berkshire (GB)

(72) Inventors: Daniel J. N. Picken, Bracknell (GB); Neil Berrington, San Jose, CA (US)

(73) Assignee: HITACHI DATA SYSTEMS ENGINEERING UK LIMITED, Berkshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/142,174

(22) Filed: Apr. 29, 2016

(65) Prior Publication Data
US 2016/0246814 A1 Aug. 25, 2016

Related U.S. Application Data

(63) Continuation of application No. 14/582,500, filed on Dec. 24, 2014, now Pat. No. 9,336,229, which is a (Continued)

(51) Int. Cl.
*G06F 7/00* (2006.01)
*G06F 17/00* (2006.01)
*G06F 17/30* (2006.01)

(52) U.S. Cl.
CPC .. *G06F 17/30174* (2013.01); *G06F 17/30088* (2013.01); *G06F 17/30115* (2013.01); *G06F 17/30117* (2013.01); *G06F 17/30371* (2013.01)

(58) Field of Classification Search
CPC ............ G06F 11/1435; G06F 2201/84; G06F 11/1458; G06F 11/1469
(Continued)

(56) References Cited

U.S. PATENT DOCUMENTS 5,819,292 A * 10/1998 Hitz ................... G06F 11/1435
707/999.203
7,133,985 B1 11/2006 Haase et al.
(Continued)

OTHER PUBLICATIONS

International Search Report—International Application No. PCT2011061671 dated Apr. 25, 2012 together with the Written Opinion of the International Searching Authority 12 pages.

*Primary Examiner* — Binh V Ho
(74) *Attorney, Agent, or Firm* — Mattingly & Malur, PC

(57) ABSTRACT

A file cloning mechanism allows for quickly creating copies (clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. At appropriate times, cloned files may be "de-cloned."

20 Claims, 23 Drawing Sheets

Related U.S. Application Data continuation of application No. 14/252,144, filed on Apr. 14, 2014, now Pat. No. 9,087,072, which is a continuation of application No. 13/301,241, filed on Nov. 21, 2011, now Pat. No. 8,738,570.

(60) Provisional application No. 61/415,928, filed on Nov. 22, 2010.

(58) Field of Classification Search
 USPC .......................................................... 707/626
 See application file for complete search history.

(56) References Cited

U.S. PATENT DOCUMENTS

| | | | |
|---|---|---|---|
| 7,334,095 B1 | 2/2008 | Fair et al. | |
| 7,457,822 B1 * | 11/2008 | Barrall | G06F 17/30067 |
| 7,480,682 B1 | 1/2009 | Haslam et al. | |
| 7,757,056 B1 * | 7/2010 | Fair | G06F 3/0605 |
| | | | 711/162 |
| 8,099,572 B1 * | 1/2012 | Arora | G06F 13/28 |
| | | | 707/640 |
| 8,738,570 B2 | 5/2014 | Picken et al. | |
| 2003/0158861 A1 * | 8/2003 | Sawdon | G06F 11/1435 |
| 2004/0030727 A1 * | 2/2004 | Armangau | G06F 11/1435 |
| 2004/0117567 A1 * | 6/2004 | Lee | G06F 11/1435 |
| | | | 711/154 |
| 2004/0260673 A1 * | 12/2004 | Hitz | G06F 11/1435 |
| 2005/0065985 A1 * | 3/2005 | Tummala | G06F 17/30067 |
| 2005/0246397 A1 * | 11/2005 | Edwards | G06F 17/30067 |
| 2005/0246503 A1 * | 11/2005 | Fair | G06F 17/30067 |
| | | | 711/147 |
| 2006/0206536 A1 * | 9/2006 | Sawdon | G06F 11/1435 |
| 2006/0212481 A1 * | 9/2006 | Stacey | G06F 17/30067 |
| 2007/0106706 A1 * | 5/2007 | Ahrens | G06F 17/30088 |
| 2008/0040385 A1 * | 2/2008 | Barrall | G06F 17/30067 |
| 2009/0100110 A1 * | 4/2009 | Holtom | G06F 17/30067 |
| 2009/0182785 A1 * | 7/2009 | Aston | G06F 17/3023 |
| 2009/0193206 A1 * | 7/2009 | Ishii | G06F 3/0607 |
| | | | 711/162 |
| 2009/0204649 A1 * | 8/2009 | Wong | G06F 17/30153 |
| 2009/0204650 A1 | 8/2009 | Wong et al. | |
| 2013/0054927 A1 * | 2/2013 | Raj | G06F 3/0608 |
| | | | 711/170 |

* cited by examiner

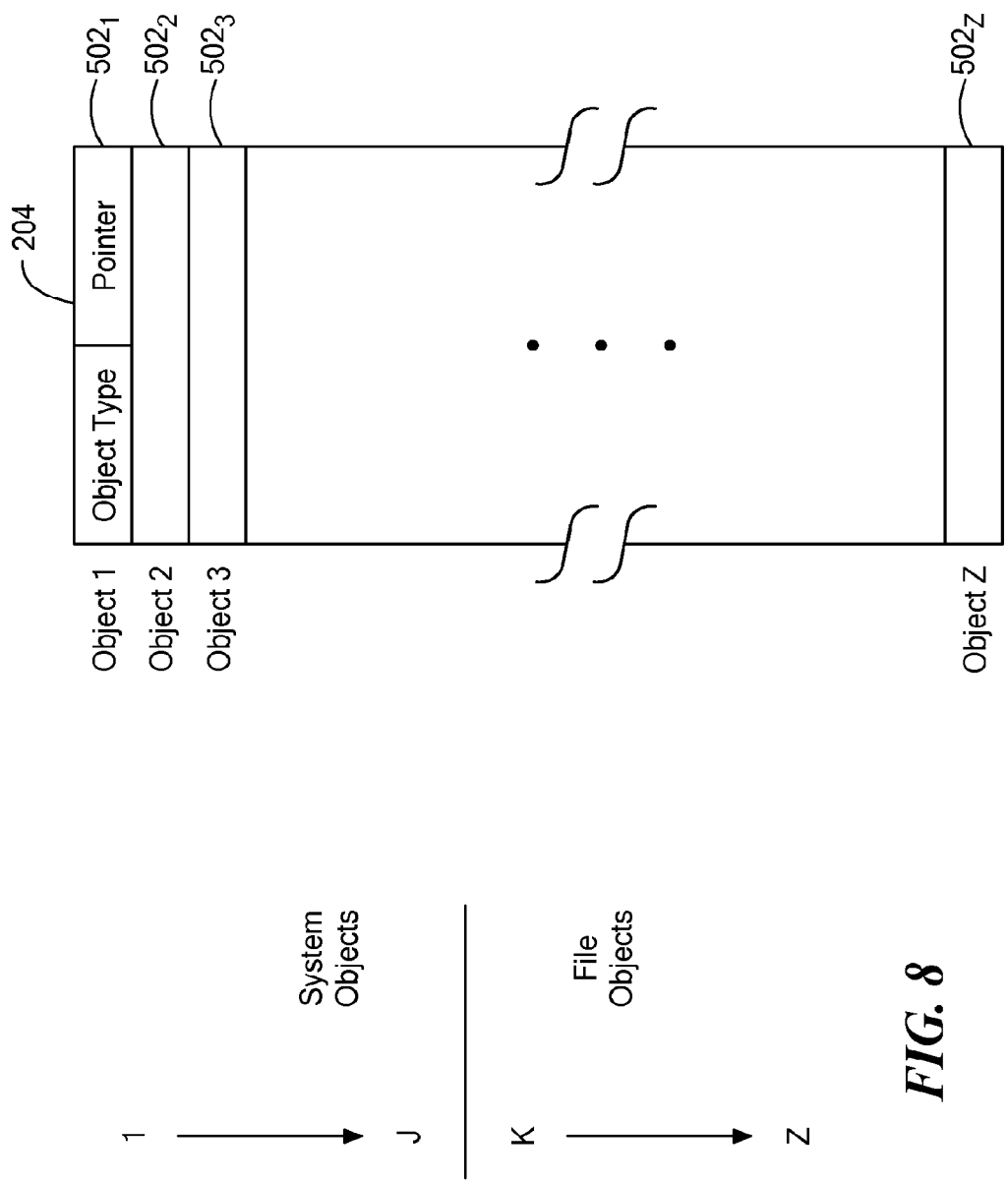

FILE CLONING AND DE-CLONING IN A DATA STORAGE SYSTEM

CROSS-REFERENCE TO RELATED APPLICATIONS

This patent application is a continuation of, and therefore claims priority from, U.S. patent application Ser. No. 14/582,500 entitled FILE CLONING AND DE-CLONING IN A DATA STORAGE SYSTEM filed on Dec. 24, 2014 in the names of Daniel J. N. Picken and Neil Berrington, which is a continuation of, and therefore claims priority from, U.S. patent application Ser. No. 14/252,144 entitled FILE CLONING AND DE-CLONING IN A DATA STORAGE SYSTEM filed on Apr. 14, 2014 in the names of Daniel J. N. Picken and Neil Berrington, which is a continuation of, and therefore claims priority from, U.S. patent application Ser. No. 13/301,241 entitled FILE CLONING AND DE-CLONING IN A DATA STORAGE SYSTEM filed on Nov. 21, 2011 in the names of Daniel J. N. Picken and Neil Berrington, which claims the benefit of U.S. Provisional Patent Application No. 61/415,928 entitled FILING CLONING IN A DATA STORAGE SYSTEM filed on Nov. 22, 2010 in the names of Daniel J. N. Picken and Neil Berrington. Each of these patent applications is hereby incorporated herein by reference in its entirety.

This patent application is related to the following patent applications, each of which is hereby incorporated herein by reference in its entirety:

U.S. patent application Ser. No. 12/164,730 entitled MULTI-WAY CHECKPOINTS IN A DATA STORAGE SYSTEM filed on Jun. 30, 2008 in the names of Christopher J. Aston, Simon L. Benham, and Neil Berrington, which is a continuation-in-part of, and therefore claims priority from, U.S. patent application Ser. No. 12/015,192 entitled VALIDATING OBJECTS IN A DATA STORAGE SYSTEM filed on Jan. 16, 2008 in the name of Christopher J. Aston.

This patent application also may be related to one or more of the following patent applications, each of which is hereby incorporated herein by reference in its entirety:

United States Patent Application entitled DYNAMIC WRITE BALANCING IN A DATA STORAGE SYSTEM, filed on even date herewith;

U.S. patent application Ser. No. 12/248,300 entitled SYSTEM, DEVICE, AND METHOD FOR VALIDATING DATA STRUCTURES IN A STORAGE SYSTEM filed on Oct. 9, 2008 in the name of John C. Holtom, which claims the benefit of U.S. Provisional Patent Application No. 60/979,561 entitled SYSTEM, DEVICE, AND METHOD FOR VALIDATING DATA STRUCTURES IN A STORAGE SYSTEM filed on Oct. 12, 2007;

U.S. patent application Ser. No. 09/879,798 entitled APPARATUS AND METHOD FOR HARDWARE IMPLEMENTATION OR ACCELERATION OF OPERATING SYSTEM FUNCTIONS, which was filed Jun. 12, 2001, now U.S. Pat. No. 6,826,615;

U.S. patent application Ser. No. 10/889,158 entitled APPARATUS AND METHOD FOR HARDWARE IMPLEMENTATION OR ACCELERATION OF OPERATING SYSTEM FUNCTIONS, which was filed on Jul. 12, 2004;

U.S. patent application Ser. No. 10/286,015 entitled APPARATUS AND METHOD FOR HARDWARE-BASED FILE SYSTEM, which was filed on Nov. 1, 2002 in the name of Geoffrey S. Barrall et al.; and U.S. patent application Ser. No. 11/841,353 entitled APPARATUS AND METHOD FOR HARDWARE-BASED FILE SYSTEM, which was filed on Aug. 20, 2007 in the name of Geoffrey S. Barrall et al.

FIELD OF THE INVENTION

The present invention relates to data storage systems, and in particular to cloning and de-cloning files in data storage systems.

BACKGROUND

U.S. patent application Ser. No. 10/286,015 entitled Apparatus and Method for Hardware-Based File System filed on Nov. 1, 2002 in the name of Geoffrey S. Barrall et al. and U.S. patent application Ser. No. 11/841,353 entitled Apparatus and Method for Hardware-Based File System filed on Aug. 20, 2007 in the name of Geoffrey S. Barrall et al., both of which are hereby incorporated herein by reference in their entireties, describe various filesystem structures that permit, among other things, a file server to maintain two copies of a filesystem, namely a current version of the filesystem and a prior "checkpoint" version of the filesystem. Specifically, the filesystem is maintained using tree structures that include a special root node that is actually a pair of structures referred to as the left hand side (LHS) and right hand side (RHS). In practice, one side is used to hold a "checkpoint" copy of the filesystem while the other side is used for ongoing management of the filesystem (including creation, deletion, and modification of filesystem objects). From time to time, the roles of the two sides reverse so that a "checkpoint" is taken using the side of the structure that was being used for ongoing management of the filesystem and ongoing management of the filesystem continues using the side of the structure that held the previous "checkpoint." Two so-called dynamic superblocks are maintained for keeping track of the current and checkpoint versions of the filesystem.

One purpose of the "checkpoint" is to store a copy of the filesystem in case an error occurs during the ongoing management of the filesystem. Under certain circumstances, the filesystem may be reverted to the "checkpoint" version. One risk in such a system is that both the current version of the filesystem and the "checkpoint" version may become corrupted. Another risk is that an important piece of information will be removed or changed, and neither the current version of the filesystem nor the "checkpoint" version will include the original piece of information.

SUMMARY OF EXEMPLARY EMBODIMENTS

In certain embodiments of the present invention, a file cloning mechanism is employed to allow for quickly creating copies (clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. Some characteristics of such file cloning include:

The data stream of a filesystem object can be effectively cloned quickly and in a relatively fixed amount of time regardless of the size of the source object's data stream, since none of the user data blocks from which the data stream is comprised need to be copied. Also, none of the metadata blocks describing the data stream (i.e., the indirect/direct onodes) needs to be copied. A very small and constant number of metadata blocks are mutated.

The complexity of handling I/O to a cloned/clone object is equivalent to a regular object.

The number of times a file or clone can be cloned is limited only by the amount of free space in the file system.

The number of clones a file system can support is limited only by the amount free space in the file system.

This file cloning has an inherent file de-duplication characteristic in that, rather than creating full copies of a source file and later performing de-duplication, the clones are essentially created as de-duplicated files that share data and metadata blocks with the source file.

Corruption of a shared block would affect multiple files, although data corruption is mitigated through redundant storage (i.e., the RAID controller) and other mechanisms.

In accordance with one aspect of the invention there is provided a method for cloning a source filesystem object in a file storage system. The source filesystem object includes at least one data block and a set of pointers directly or indirectly referencing the at least one data block. The method involves creating in the file storage system a read-only data-stream-snapshot object and storing a copy of the set of pointers in the data-stream-snapshot object; and creating in the file storage system a mutable clone object and storing a copy of the set of pointers in the clone object, wherein the data-stream-snapshot object and the clone object share the at least one data block with the source filesystem object without making separate copies of the at least one data block for the data-stream-snapshot object and the clone object, and wherein the source filesystem object and the clone object effectively become mutable versions of the data-stream-snapshot object and effectively store changes from the read-only copy of the object represented by the data-stream-snapshot object.

In accordance with another aspect of the invention there is provided apparatus for cloning filesystem objects including a source filesystem object in a file storage system. The source filesystem object includes at least one data block and a set of pointers directly or indirectly referencing the at least one data block. The apparatus comprises at least one storage device; and a storage processor in communication with the at least one storage device, the storage processor configured for creating in the file storage system a read-only data-stream-snapshot object and storing a copy of the set of pointers in the data-stream-snapshot object; and creating in the file storage system a mutable clone object and storing a copy of the set of pointers in the clone object, wherein the data-stream-snapshot object and the clone object share the at least one data block with the source filesystem object without making separate copies of the at least one data block for the data-stream-snapshot object and the clone object, and wherein the source filesystem object and the clone object effectively become mutable versions of the data-stream-snapshot object and effectively store changes from the read-only copy of the object represented by the data-stream-snapshot object.

In various alternative embodiments, each object may include a root onode, and the set of pointers may be stored in the object root onode. The set of pointers may be copied from the source filesystem object to the data-stream-snapshot object and then from the data-stream-snapshot object to the clone object.

Embodiments may also involve storing in the data-stream-snapshot object a reference to the source filesystem object and a reference to the clone object; storing in the source filesystem object a reference to the data-stream-snapshot object; and storing in the clone object a reference to the data-stream-snapshot object.

Embodiments may also involve maintaining a reference count in the data-stream-snapshot object, the reference count indicating the number of objects in the filesystem that reference the data-stream-snapshot object.

Embodiments may also involve attributing to the clone object the size of the source filesystem object from which the clone object was created.

Embodiments may also involve, upon modification of the mutable source filesystem object or the mutable clone object, allocating at least one data block for storage of the modification and associating the at least one allocated data block with the modified object, the modified object including a modified set of pointers. The modified object may be cloned, for example, by creating in the file storage system a second read-only data-stream-snapshot object and storing a copy of the modified set of pointers in the second data-stream-snapshot object; and creating in the file storage system a second mutable clone object and storing a copy of the modified set of pointers in the second clone object. This cloning may also involve storing in the second data-stream-snapshot object a reference to the modified object, a reference to the second clone object, and a reference to the first data-stream-snapshot object; storing in the modified filesystem object a reference to the second data-stream-snapshot object; and storing in the second clone object a reference to the second data-stream-snapshot object.

Embodiments may also involve creating further clones of the source object using the data-stream-snapshot object.

Embodiments may also involve de-cloning objects.

BRIEF DESCRIPTION OF THE DRAWINGS

The foregoing features of the invention will be more readily understood by reference to the following detailed description, taken with reference to the accompanying drawings, in which:

FIG. 8 shows a representation of object number assignments for an exemplary embodiment of the present invention;

FIG. 9 is a schematic block diagram showing the general format of the indirection object in accordance with an exemplary embodiment of the present invention;

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 2:
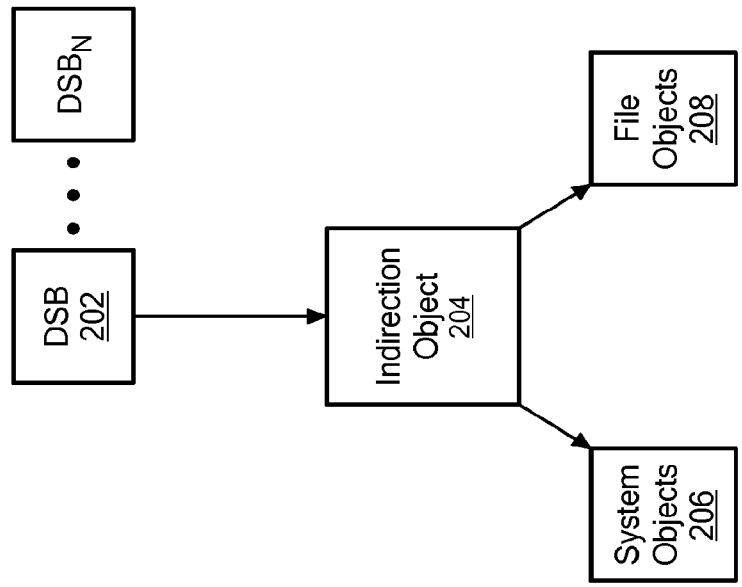
FIG. 2 is a schematic block diagram showing the general format of a filesystem in accordance with an exemplary embodiment of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems can be configured to expand automatically (or alternatively to prevent or restrict auto-expansion) or can be expanded manually.

A "set" of values may include one or more values.

Headings are used below for convenience and are not to be construed as limiting the present invention in any way.

In certain embodiments of the present invention, a file cloning mechanism is employed to allow for quickly creating copies (clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. At appropriate times, cloned files may be "de-cloned."

Exemplary embodiments of the present invention are described with reference to an exemplary filesystem, although it should be noted that various cloning and de-cloning concepts may be applied to other types of filesystems.

Exemplary Filesystem

Figure 1:
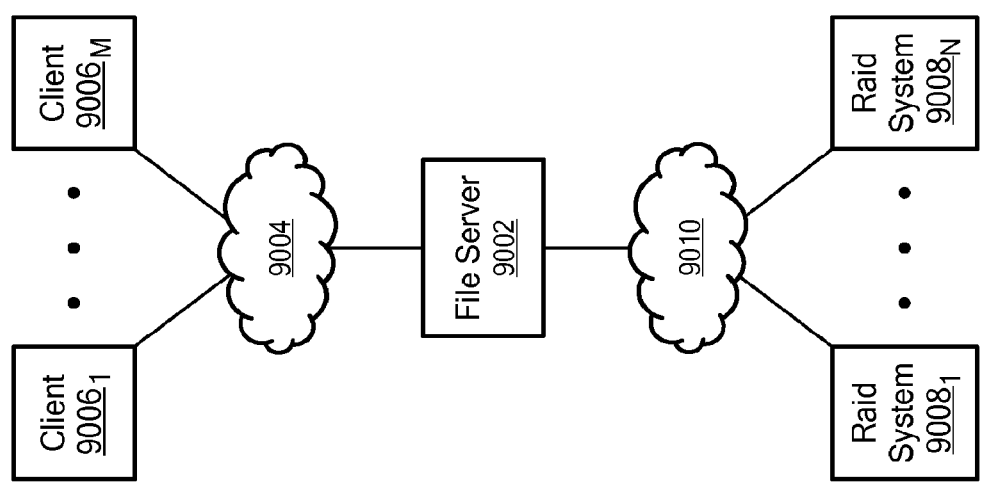
FIG. 1 is a schematic block diagram of a file storage system in accordance with an exemplary embodiment of the present invention.

FIG. 1 is a schematic block diagram of a file storage system in accordance with an exemplary embodiment of the present invention. Among other things, the file storage system includes a number of file servers (a single file server 9002 is shown for the sake of simplicity and convenience) in communication with various client devices $9006_1$-$9006_M$ over a communication network 9004 such as an Internet Protocol network (e.g., the Internet) and also in communication with various RAID systems $9008_1$-$9008_N$ over a storage network 9010 such as a FibreChannel network. The client devices $9006_1$-$9006_M$ and the file server 9002 communicate using one or more network file protocols, such as CIFS and/or NFS. The file server 9002 and the RAID systems $9008_1$-$9008_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 includes a storage processor for managing one or more filesystems. The file server 9002 can be configured to allow client access to portions of the filesystems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based filesystem including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 9002 is configured to use one or more SDs, which can be from a single RAID system or from multiple RAID systems. The file server 9002 can normally interrogate the RAID systems to find out whether each SD is primary or secondary. The method of controlling which SDs are used by the file server 9002 is referred to herein as "licensing." Thus, in practice, the file server 9002 will typically be licensed for some SDs and unlicensed for others.

Internally, the file server 9002 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Filesystem Tree Structure

The file server 9002 stores various types of objects in the filesystem. The objects may be classified generally as system objects and file objects. File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. An software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

An instantiation of the filesystem is managed using a tree structure having root node (referred to as a dynamic superblock or DSB) that is preferably stored at a fixed location within the storage system. Among other things, storing the DSB at a fixed location makes it easy for the file server 9002 to locate the DSB. The file server 9002 may maintain multiple DSBs to store different versions of the filesystem representing different checkpoints (e.g., a current "working" version and one or more "checkpoint" versions). In an exemplary embodiment, the DSB includes a pointer to an indirection object (described in detail below), which in turn includes pointers to other objects.

FIG. 2 is a schematic block diagram showing the general format of a filesystem instantiation in accordance with an exemplary embodiment of the present invention. The DSB 202 is a special structure that represents the root of the filesystem tree structure. Among other things, the DSB 202 includes a pointer to an indirection object 204, which in turn includes pointers to other objects in the filesystem including system objects 206 and file objects 208.

In embodiments of the present invention, N dynamic superblocks (N>2) are maintained for a filesystem, only one of which is considered to be the most up to date at any given point in time. The number of DSBs may be fixed or configurable. The DSBs are located at fixed locations and are used to record the state of the checkpoints on the disk. Each DSB points to an indirection object.

Among other things, the following information is stored in each dynamic superblock:

The checkpoint number associated with this dynamic superblock.

The handle of the modified checkpoint objects list object for this checkpoint.

The object number of the modified retained objects list object from the last retained checkpoint.

The state of this checkpoint (i.e., whether or not a checkpoint has been created).

A CRC and various other information to allow the DSB and other structures (e.g., the indirection object) to be checked for validity.

In an exemplary embodiment, the DSBs are treated as a circular list (i.e., the first dynamic superblock is considered to successively follow the last dynamic superblock), and each successive checkpoint uses the next successive dynamic superblock in the circular list. When the file server 9002 opens the volume, it typically reads in all dynamic superblocks and performs various checks on the DSBs. The DSB having the latest checkpoint number with the checkpoint state marked as completed and various other sanity checks passed is considered to represent the latest valid checkpoint on this volume. The file server 9002 begins using the next DSB in the circular list for the next checkpoint.

The general format of the indirection object 204 is discussed below.

Object Tree Structure

Generally speaking, each object in the filesystem, including the indirection object 204, each of the system objects 206, and each of the file objects 208, is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 3:
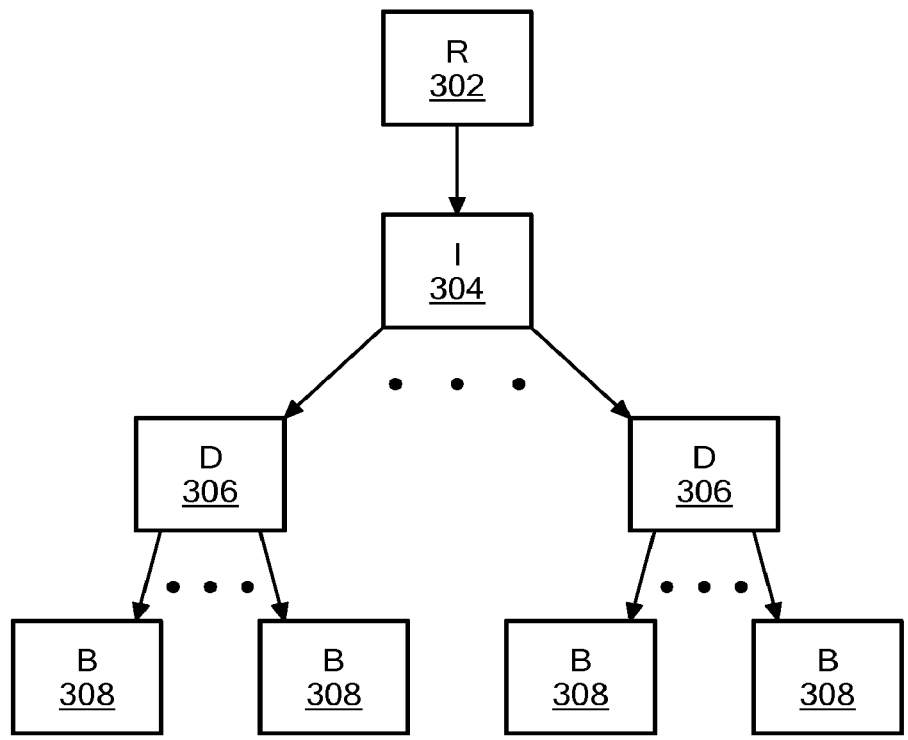
FIG. 3 is a schematic block diagram showing the general format of an object tree structure in accordance with an exemplary embodiment of the present invention.

FIG. 3 is a schematic block diagram showing the general format of an object tree structure in accordance with an exemplary embodiment of the present invention. A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks.

Figure 4:
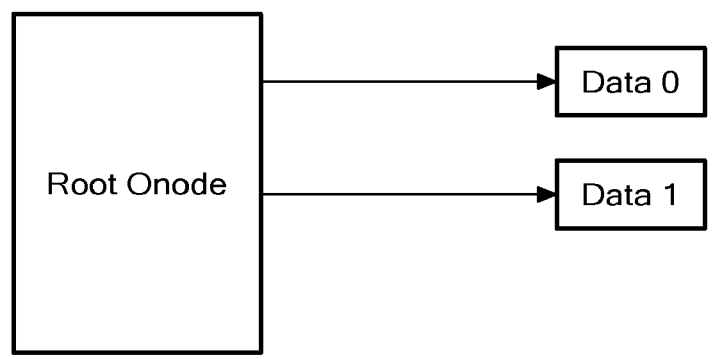
FIG. 4 is a block diagram showing use of a root onode with no other onodes in accordance with an exemplary embodiment of the present invention.

As data is added to the object, it is first of all put into data blocks pointed to directly from the root node. This is illustrated in the diagram of FIG. 4, showing use of a root node with no other nodes. Note that, for the sake of simplicity in this and all the following diagrams, the root node and direct node are shown as having only two data pointers, and the indirect node is shown as only having two indirect or direct node pointers.

Figure 5:
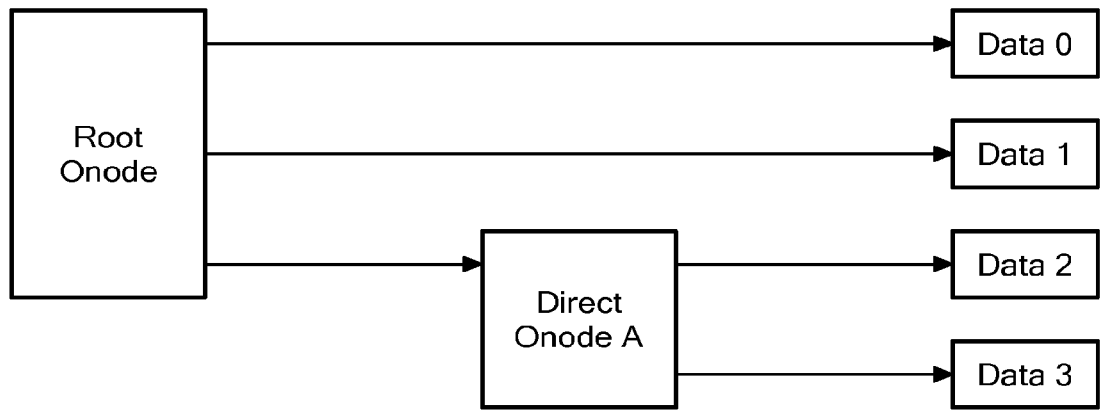
FIG. 5 is a block diagram showing employment of a root onode with a direct onode in accordance with an exemplary embodiment of the present invention.

Once all the direct block pointers in the root node are filled, then a direct node A is created with a pointer from the root node to the direct node. FIG. 5 shows employment of a root node with this direct node A. Note that the root node has multiple data block pointers but only a single pointer to either a direct or an indirect node.

Figure 6:
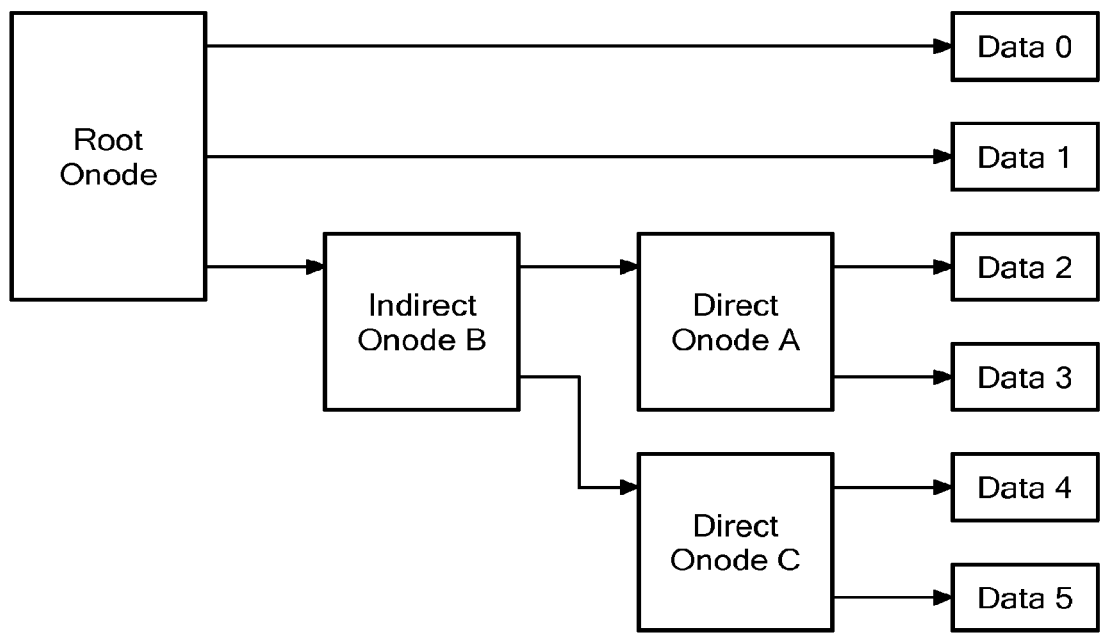
FIG. 6 is a block diagram showing employment of a root onode with an indirect onode as well as direct onodes in accordance with an exemplary embodiment of the present invention.

If the data in the object grows to fill all the data pointers in the direct node, then an indirect node B is created, as illustrated in FIG. 6. FIG. 6 shows employment of a root node with an indirect node as well as direct nodes. The pointer in the root node which was pointing to the direct node A, is changed to point at the indirect node B, and the first pointer in the indirect node B is set to point at the direct node A. At the same time a new direct node C is created, which is also pointed to from the indirect node B. As more data is created more direct nodes are created, all of which are pointed to from the indirect node.

Figure 7:
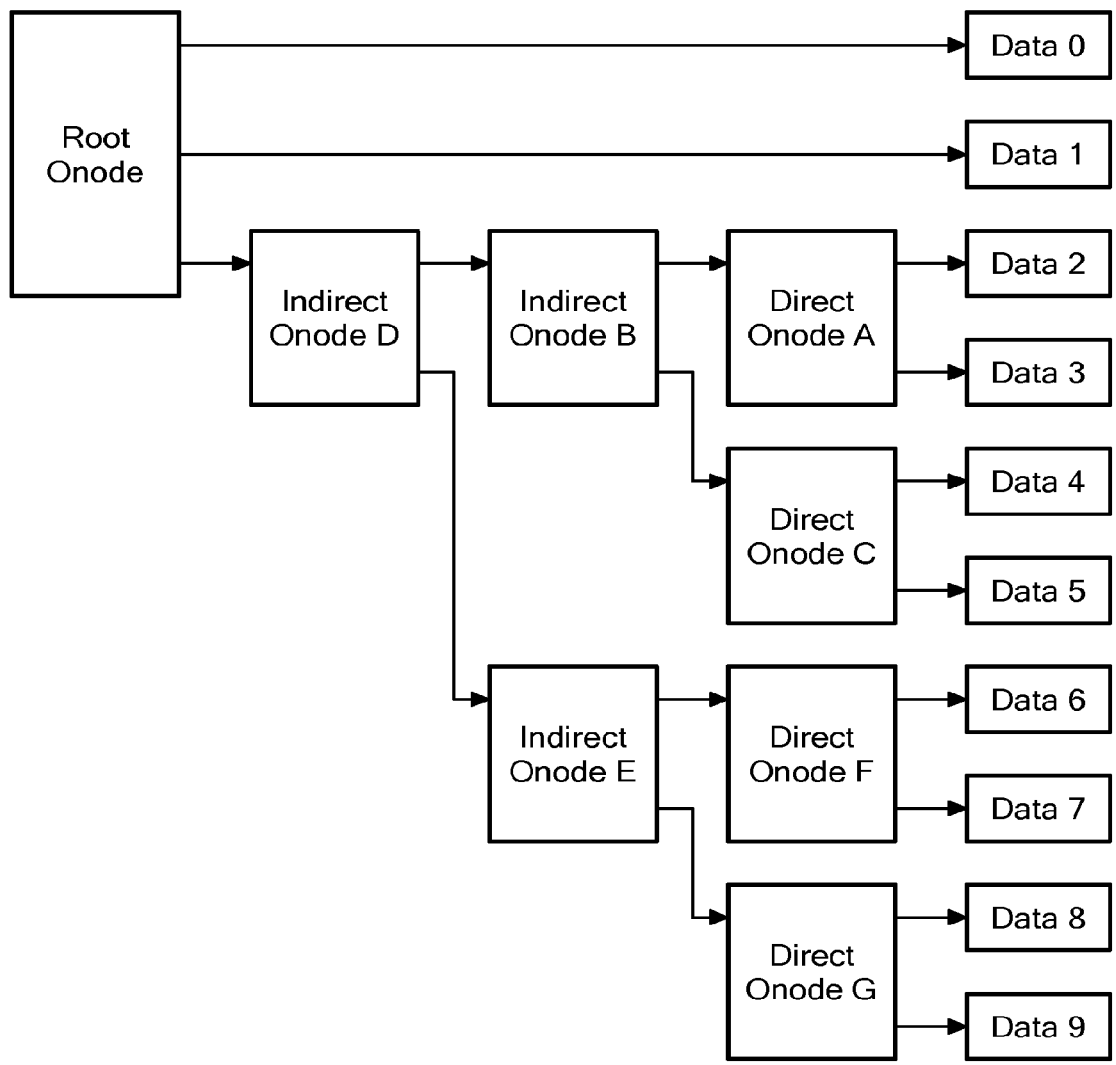
FIG. 7 is a block diagram illustrating use of multiple layers of indirect onodes placed between the root onode and the direct onodes in accordance with an exemplary embodiment of the present invention.

Once all the direct node pointers in the indirect node B have been used another indirect node D is created which is inserted between the root node and the first indirect node B. Another indirect node E and direct node F are also created to allow more data blocks to be referenced. These circumstances are shown in FIG. 7, which illustrates use of multiple layers of indirect nodes placed between the root node and the direct nodes.

This process of adding indirect nodes to create more levels of indirection is repeated to accommodate however much data the object contains.

The object root node includes a checkpoint number to identify the checkpoint in which the object was last modified (the checkpoint number initially identifies the checkpoint in which the object was created and thereafter the checkpoint number changes each time the object is modified in a new checkpoint). In an exemplary embodiment, the checkpoint number at which the object was created is also stored in the object root node. Also in the object root node is a parameter to identify the type of object for which the object root node is providing metadata. The object type may, for example, be any of freespace, file, or directory. In addition to object type, the object root node also has a parameter for the length of the object in blocks.

The object root node also carries a series of pointers. One of these is a pointer to any immediately preceding version of the object root node. If it turns out that a retained checkpoint has been taken for the pertinent checkpoint, then there may have been stored an immediately preceding version of the object root node in question, and the pointer identifies the sector number of such an immediately preceding version of the object root node.

For the actual data to which the object root node corresponds, the object root node includes a separate pointer to each block of data associated with the corresponding object. The location of up to 18 data blocks is stored in the object root node. For data going beyond 18 blocks, a direct node is additionally required, in which case the object root node also has a pointer to the direct node, which is identified in the object root node by sector number on the disk.

The direct node includes a checkpoint number and is arranged to store the locations of a certain number of blocks (e.g., about 60 or 61 blocks) pertinent to the object.

When a first direct node is fully utilized to identify data blocks, then one or more indirect node are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, irrespective of the file's fragmentation.

Various embodiments of the present invention may include mechanisms to facilitate creation of large files, which are typically sparse files that are filled with zeros when first created.

One such mechanism allows zero-filled data blocks to be allocated without actually writing zeros into the data blocks. Specifically, theobject root nodes and the direct nodes include a flag for each block pointer to indicate whether the corresponding block is logically filled with zeros (the block does not actually need to be filled with zeros). Thus, for example, when a data block is allocated, rather than filling the data block with zeros, the bit associated with the data block can be set to indicate that the data block is zero-filled, and read accesses to that data block will return zeros without actually reading data from the data block.

A similar mechanism allows files to be created without actually allocating all data blocks and nodes for the file. Specifically, pointers to blocks and other nodes may include a bit to indicate whether or not the block or other node has been actually created. In a case where the relevant blocks and nodes have not yet been created, then blocks and nodes are created as necessary to accommodate write requests, and the allocation bit is toggled accordingly. Note that creating a block requires allocation of space, writing the data to the block, and setting the bit flags for the pertinent nodes. In one particular exemplary embodiment, this mechanism is only used to create files without allocating all data blocks; other file nodes are allocated as described above.

transaction log, as well has being maintained on the fly in a metadata cache.

Node structure may also be established, in an exemplary embodiment, in a manner to further reduce disk writes in connection with node structures. In the end, the node structure needs to accommodate the storage not only of file contents but also of file attributes. File attributes include a variety of parameters, including file size, file creation time and date, file modification time and date, read-only status, and access permissions, among others. This connection takes advantage of the fact that changing the contents of an object root node can be performed frequently during a given checkpoint, since the object root node is not yet written to disk (i.e., because disk writes of object root nodes are delayed, as discussed above). Therefore, in an exemplary embodiment, a portion of the object root node is reserved for storage of file attributes.

More generally, the following structures for storage of file attributes are defined in an exemplary embodiment:

enode (little overhead to update, limited capacity). This structure is defined in the object root node and is 128 bytes in an exemplary embodiment.

software metadata object (expensive in overhead to update, near infinite capacity). This is a dedicated object for storage of metadata and therefore has its own storage locations on disk; the object is identified in the enode.

Thus, in an exemplary embodiment, each object root node stores the following types of information:

The checkpoint number.
The data length for this version of the object.
The number of levels of indirection used in the runlist for this object.
The type of the object. This is primarily used as a sanity check when a request comes in to access the object.

A pointer to an older root node version made for a retained checkpoint (if there is one).

A pointer to a newer root node version (will only be valid if this is a copy of a root node made for a retained checkpoint).

Up to 19 data block descriptors. Each data block descriptor includes a pointer to a data block, the checkpoint number, and a bit to say whether the block is zero filled.

A single pointer to either a direct node or an indirect node.

The 128 bytes of enode data for this object.

A CRC and various sanity dwords to allow the root node to be checked for validity.

As discussed below, an object may include copies of root nodes that are created each time a retained checkpoint is taken. The pointer to the older root node version and the pointer to the newer root node version allow a doubly-linked list of root nodes to be created including the current root node and any copies of root nodes that are created for retained checkpoints. The doubly-linked list facilitates creation and deletion of retained checkpoints.

As discussed above, the indirect node provides a level of indirection between the root node and the direct node. The following information is stored in the indirect node in an exemplary embodiment:

The checkpoint number.

Pointers to either indirect or direct nodes (e.g., up to 122 such pointers).

A CRC and various sanity dwords to allow the indirect node to be checked for validity.

As discussed above, the direct node provides direct pointers to data blocks on the disk. The following information is stored in the direct node in an exemplary embodiment:

The checkpoint number.

A number of data block descriptors (e.g., up to 62 such descriptors). Each data block descriptor includes a pointer to a data block, the checkpoint number, and a bit to say whether the block is zero filled.

A CRC and various sanity dwords to allow the indirect node to be checked for validity.

As data is deleted from the object and data blocks and direct and indirect nodes are no longer required, they are returned to the free space allocation controller.

In accordance with one embodiment, the number of levels of indirection decreases as the object gets smaller, until all the data in the object can be referenced via the direct block pointers in the root node, at which point all the remaining direct and indirect nodes are freed and the indirection level will be set to zero.

If a write operation to a particular file object has a start offset that is beyond the current end of the object or the length of the object is set to be greater than the current length, then the undefined portion of the object (e.g., between the current end of the object and the start of newly written data) is typically filled with zeroes. In a typical implementation, this involves allocating disk blocks for all zero-filled portions of the object and filling those disk blocks with zeros. For a 1 GB file, this might take of the order of 10 seconds. For a 1 TB file, it might take on the order of 3 hours.

In an exemplary embodiment of the present invention, rather than actually zero-filling the data blocks associated with undefined portion of the object, the contents of those data blocks are left unwritten, and a bit within each data block pointer is used to indicate that the block is deemed to be zero-filled. If the file server 9002 (and, in particular, the Object Store sub-module) sees this bit set, then it knows that the block should be filled with zeroes, even though on disk it may contain something completely different. If the block is read, then the file server 9002 returns zeroes for this block rather than returning its actually on-disk contents. If the block is written in such a way that the write does not fill the entire block, then the file server 9002 will write zeroes to the portion of the block that is not being written and will then reset the "zero-filled" bit for this block.

Another concern with setting the length of an object to some very large value is the time it takes to allocate the data blocks and create the required direct and indirect node structures. For example, in an exemplary embodiment using a disk block size of 4K, a 1 TB object requires approximately 4 million direct nodes as well as a lesser number of indirect nodes. This might take in the order of 40 seconds to write to disk. Also the free space allocation of all the data blocks required, and the subsequent updates to the free space bitmap, would significantly add to this time. If a checkpoint were to be taken immediately after the file creation begins, the entire system generally would stop servicing requests (to any volumes) for the whole of this time.

In an alternative embodiment of the invention, this issue may be addressed by not actually allocating disk blocks for the zero-filled portions of the file, as discussed above. This means that when the object store sees a write to a zero filled block, it would first have to allocate disk space for that block and put a pointer to it in the relevant node structure.

In yet another alternative embodiment, in addition to not actually allocating disk blocks for the zero-filled portions of the file, this issue may be address by also not creating the corresponding node structures either. To implement this aspect, each node pointer could include a bit to indicate whether or not the node to which it points is allocated. If the node is not allocated, when an operation comes along which requires that node to be valid, only then would disk space be allocated for it and the correct pointer inserted. In this way, a huge zero-filled object may have only a root node, which can be created very quickly.

Object Numbers and the Indirection Object

Within the file storage system, each object is associated with an object number that is used to reference the object. System objects typically have fixed, predefined object numbers, since they generally always exist in the system. File objects are typically assigned object numbers dynamically from a pool of available object numbers. These file object numbers may be reused in some circumstances (e.g., when a file is deleted, its object number may be freed for reuse by a subsequent file object).

FIG. 8 shows a representation of object number assignments for an exemplary embodiment of the present invention. Specifically, the filesystem may include Z object numbers (where Z is variable and may grow over time as the number of objects increases). A certain range of object numbers is reserved for system objects 206 (in this example, object numbers 1-J), and the remaining object numbers (in this example, object numbers K-Z) are assigned to file objects 208. Typically, the number of system objects 206 is fixed, while the number of file objects 208 may vary.

In an exemplary embodiment, the indirection object 204 is logically organized as a table, with one table entry per object indexed by object number. As shown in FIG. 9, each entry 502 in the table includes an object type field and a pointer field. A number of different values are defined for the object type field, but for the sake of discussion, one set of values is defined for "used" objects and another set of values is defined for "free" objects. Thus, the value in the object type field of a particular table entry will indicate whether the corresponding object number is used or free.

The pointer field of each used table entry includes a pointer to the root node of the object. When an object is created, an object root node is created (as discussed above), and an object number is assigned to the object. A pointer to the object root node is stored in the indirection object 204, specifically in the table entry associated with the assigned object number. Therefore, the file server 9002 can easily locate the object root node of any object based on its object number, specifically by indexing into the indirection object table structure and accessing the pointer field. Initially, the root node of such an "empty" object has no pointers to any indirect nodes, direct nodes, or data blocks, although data blocks, indirect nodes, and direct nodes may be added to the object tree structure over time.

The pointer fields of free table entries are used to maintain one or more free object number lists (and preferably two singly-linked, non-circular free object number lists, for example, as described in U.S. Provisional Patent Application No. 60/979,561 entitled System, Device, and Method for Validating Data Structures in a Storage System, which was filed on Oct. 12, 2007 and is hereby incorporated herein by reference in its entirety.

Specifically, the table entry associated with each free object number includes a reference to a next free object number in its free object number list rather than a pointer to the root node of an object. Because a free object number list is a singly-linked, non-circular list in an exemplary embodiment, the table entry associated with the last free object number in a free object number list includes a "null" reference (e.g., the value zero).

Theoretically, it would be possible to maintain a single free object number list in the indirection object. Free object numbers in the list could be recycled and removed from the list as new objects are created, and free object numbers could be added to the list as objects are deleted from the system.

In an exemplary embodiment of the invention, however, two separate free object number lists are maintained in the indirection object, one listing free object numbers that are immediately available for recycling and the other listing newly freed object numbers that are not immediately available for recycling. In this exemplary embodiment, the file server takes a "checkpoint" or "snapshot" of the filesystem from time to time (e.g., as discussed below or in U.S. patent application Ser. No. 10/286,015 entitled Apparatus and Method for Hardware-Based File System filed on Nov. 1, 2002 in the name of Geoffrey S. Barrall et al. and U.S. patent application Ser. No. 11/841,353 entitled Apparatus and Method for Hardware-Based File System filed on Aug. 20, 2007 in the name of Geoffrey S. Barrall et al., both of which are hereby incorporated herein by reference in their entireties), such that, at any give time, the file server has a "working copy" of the filesystem that may change, for example, as objects are created, deleted, and modified. For various reasons, it is important for this exemplary embodiment to ensure that, over time, different objects that are assigned a particular recycled object number are given different object handles. Therefore, in this exemplary embodiment, two free object number lists are used to ensure that a particular object number cannot be freed and reused within the same working copy of the filesystem (i.e., by adding freed object numbers to one list but allocating object numbers from the other list), and the bottom 32 bits of the current checkpoint number are included in the object handle when the object is created so that objects created in different checkpoints will have different handles. Thus, during any particular working copy of the filesystem, the file server recycles free object numbers from one list while adding newly freed object numbers to the other list. At each "checkpoint," the roles of the two lists are "swapped" so that object numbers freed during the previous checkpoint are available to be recycled while new object numbers that are freed during the current checkpoint are not available to be recycled during that checkpoint. If the list from which free object numbers are being recycled is empty when a new object is being created, then the indirection object is expanded in order to provide additional free object numbers (even though there may actually be some free object numbers in the other list). In practice, however, both lists will generally accumulate a number of free object numbers over time due to the role swapping at each checkpoint, so, in the steady state, the indirection object should not need to expand often.

In an exemplary embodiment, the DSB 202 includes a pointer to the indirection object 204 (and, more specifically, to the root node of the indirection object 204), and also includes two pointers, one for each of the free object number lists in the indirection object 204. Each pointer points to the table entry at the start of its respective free object number list. Because the DSB 202 is stored at a fixed location within the storage system and includes pointers to the indirection object 204 and the free object number lists within the indirection object 204, the file server 9002 can easily locate the indirection object 204 (and hence the root node of any other object) as well as free object number lists using the DSB 202.

Thus, with reference again to the table structure of the indirection object 204 shown in FIG. 4, the value in the object type field of a particular table entry will indicate whether the corresponding object number is used or free. If that object number is used, then the pointer field of that table entry will include a pointer to the root node of the corresponding object. If, however, that object number is free, then the pointer field of that table entry will include a reference to a next free object number in its free object number list.

Generally speaking, freed object numbers are added to the head of a free object number list, and recycled object numbers are also taken from the head of a free object number list.

As discussed in U.S. Provisional Patent Application No. 60/979,561 entitled System, Device, and Method for Validating Data Structures in a Storage System, which was incorporated by reference above, from time to time, it may be necessary or desirable to verify the indirection object 204, including the free object number list(s), in order to ensure that all free object numbers are included in the free object number list(s) and that no "used" object numbers are included in the free object number list(s). One way to verify the indirection object 204, including the free object number list(s), is to traverse each free object number list from the start to end to ensure that there are no loops and to ensure that the list ends with a null reference. However, in a working data storage system, it is not unusual for large numbers of objects to be created and deleted over time, such that the free object number list(s) can become quite long. Furthermore, the free object number lists are not ordered but instead are updated as object numbers happen to be used and freed, so traversing a free object number list would generally entail jumping around the indirection object 204 according to the references of the singly-linked list. Such traversal of a free object number list would generally be slow and inefficient.

Therefore, in an exemplary embodiment of the present invention, the indirection object table structure is traversed sequentially from top to bottom, and the "used" and "free" object numbers are tracked using a bitmap or other appropriate data structure. Specifically, if a particular object number is used, then the corresponding bit in the bitmap is marked; if that bit was already marked, then the indirection object is corrupted (e.g., because that "used" object number is erroneously referenced by an earlier "free" entry). If a particular object number is free, then the corresponding entry in the indirection object table structure includes a reference to the next free object number in the free object number list, so the bit corresponding to such next free object number is marked in the bitmap; if that bit was already marked, then the indirection object is corrupted (e.g., because the free object number list includes a "used" object number or because the free object number list includes a circular reference). After the entire indirection object table structure has been traversed, the two starting table entries, which are pointed to by the pointers in the DSB 202, are checked, and if either table entry is "used," then the indirection object is corrupted. Furthermore, after the entire indirection object table structure has been traversed, the only bits that should be left unmarked are the bits associated with the two starting table entries for the two free object number lists, which are pointed to by the pointers in the DSB 202. If either of those bits is marked, then the indirection object is corrupted. If any other bits in the bitmap are unmarked, then the corresponding object numbers are neither used nor included in the free object number lists, in which case the indirection object is usable (because such "unlinked" free entries will not be recycled in the normal course). Additional processing may be performed to ensure that each free object number list terminates with a null reference.

In various alternative embodiments, the bitmap could be initialized to all zeros, and a bit in the bitmap could be "marked" by setting the bit (i.e., to one); in this regard, a so-called "test-and-set" operation may be used to both test the value of the bit and set the bit in a single operation. Alternatively, the bitmap could be initialized to all ones and a bit in the bitmap could be "marked" by clearing the bit (i.e., to zero). Of course, other types of data structures and other types of marking schemes may be used in other embodiments. The present invention is not limited to the use of a bitmap or to any particular type of data structure or marking scheme.

In an exemplary embodiment, the indirection object may be implemented as a "pseudo-file" having no actual storage blocks. In an exemplary embodiment, instead of having pointers to actual data blocks in the object tree structure (e.g., as shown in FIG. 2), such pointers in the indirection object tree structure point to the root nodes of the corresponding objects. Thus, in an exemplary embodiment, the indirection object maps each object number to the sector address of the root node associated with the corresponding filesystem object. The indirection object tree structure can then be traversed based on an object number in order to obtain a pointer to the root node of the corresponding object.

In an exemplary embodiment, the indirection object "pseudo-file" is structured so that a common piece of code can be used to traverse the indirection object tree structure based on an object number in order to obtain a pointer to the root node of the corresponding object and to traverse other object tree structures based on a file offset in order to obtain a pointer to the corresponding data block. In such an embodiment, the object number is essentially converted into a virtual file offset, and then the indirection object tree structure is traversed in the same way that other object tree structures are traversed using an actual file offset. One advantage of having common code that can be used to traverse both the indirection object "pseudo-file" tree structure and other object tree structures is that a single logic block can be used for both functions, which is particularly advantageous for the tree traversal function in hardware.

Exemplary System Objects

As discussed above, the filesystem includes various types of system objects. Generally speaking, system objects have fixed, pre-defined object numbers, although certain system objects may have variable object numbers. The following is a description of some system objects in an exemplary embodiment of the present invention.

A root directory object is a system object (i.e., it has a root node and a fixed predetermined object number) that maps file names to their corresponding object numbers. Thus, when a file is created, the file storage system allocates a root node for the file, assigns an object number for the file, adds an entry to the root directory object mapping the file name to the object number, and adds an entry to the indirection object mapping the object number to the disk address of the root node for the file. An entry in the indirection object maps the root directory object number to the disk address of the root directory object's root node.

Figure 10:
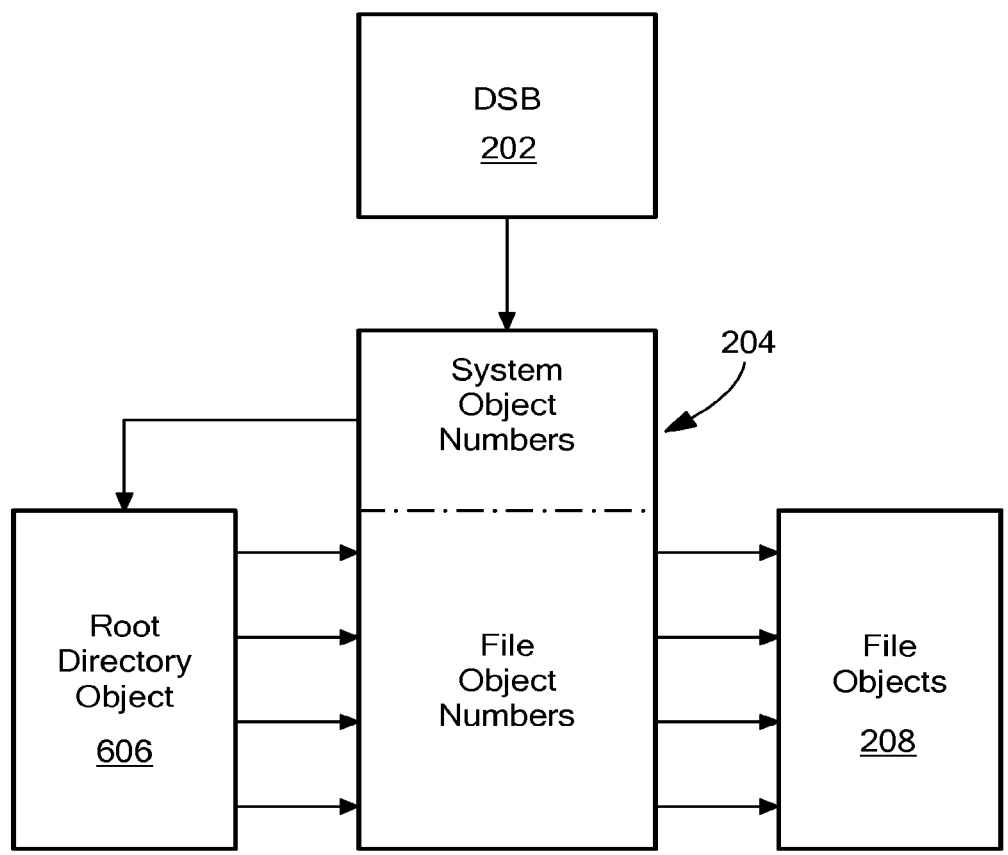
FIG. 10 is a schematic block diagram demonstrating the general relationship between the DSB, the indirection object, the root direction object, and the file objects, in accordance with an exemplary embodiment of the present invention.

FIG. 10 is a schematic block diagram demonstrating the general relationship between the DSB 202, the indirection object 204, the root directory object 606, and the file objects 208, in accordance with an exemplary embodiment of the present invention. As mentioned above, an entry in the indirection object maps the root directory object number to the disk address of the root directory object's root node, the root directory object maps file names to object numbers, and the indirection object maps object numbers to objects. Therefore, when the file server 9002 needs to locate an object based on the object's file name, the file server 9002 can locate the root directory object 606 via the indirection object (i.e., using the object number associated with the root directory object 606), map the file name to its corresponding object number using the root directory object 606, and then locate the object via the indirection object using the object number.

A free space bit map object is a system object (i.e., it has a root node and a fixed predetermined object number) that indicates free storage blocks in the file storage system. An entry in the indirection object maps the free space bit map object number to the disk address of the free space bit map object's root node.

A modified checkpoint objects lists object is a system object (i.e., it has a root node and a fixed predetermined object number) that identifies objects that have been created or modified during a checkpoint cycle. At the start of each checkpoint, a modified checkpoint objects list object is created. Each time a different object is created or modified as part of this checkpoint, its object number is written to the modified checkpoint objects list object so that, when the checkpoint is created, there is an object that lists all the objects created or modified in that checkpoint.

A free blocks object is a system object that is used to keep track of data blocks that have become unused by the filesystem during a particular checkpoint. The free blocks object lists the sector addresses that are available to be freed. The fact that a particular data block has become unused by the filesystem does not necessarily mean that the data block can be freed for reuse, since the data block may be associated with an earlier checkpoint and/or retained checkpoint. Thus, other mechanisms (e.g., a background cleanup task) are typically used to decide how and when blocks are available to be freed.

In one contemplated embodiment, the file storage system would maintain N free blocks objects for N checkpoints (where N is typically greater than two), with the indirection object including separate entries for the N free blocks objects using fixed predetermined free blocks object numbers (i.e., N entries in the indirection object). In such an embodiment, when a particular checkpoint is being deleted (e.g., the N+1th checkpoint), the file storage system would process the free blocks object associated with that checkpoint so that the information contained therein is not lost.

In an alternate contemplated embodiment, the file storage system could maintain more than N free blocks objects (even though only N checkpoints are maintained) so that the free blocks objects could be processed using a background cleanup process rather than a run-time process. In such an embodiment, since the number of free blocks objects in the system could vary, it would not be practical to have a fixed number of entries in the indirection object, so a directory of free blocks objects (e.g., a free blocks directory object) could be used instead. Here, a single entry in the indirection object could be used for the free blocks directory object, and the free blocks directory object could maintain pointers to the individual free blocks objects.

A retained checkpoint configuration object is a system object that is used to maintain a list of retained checkpoints. An entry in the indirection object maps the retained checkpoint configuration object number to the disk address of the retained checkpoint configuration object's root node. The retained checkpoint configuration object is discussed in further detail below.

Multi-Way Checkpoints

In certain embodiment, multiple checkpoints may be taken so that multiple versions of the filesystem can be maintained over time. For example, multiple separate root structures (referred to hereinafter as "dynamic superblocks" or "DSBs") are used to manage multiple instantiations of the filesystem. The DSBs are preferably stored in fixed locations within the storage system for easy access, although the DSBs may alternatively be stored in other ways. There are typically more than two DSBs, and the number of DSBs may be fixed or variable. There is no theoretical limit to the number of DSBs (although there may be practical limits for various implementations). In this way, if it becomes necessary or desirable to revert the filesystem back to a previous "checkpoint," there are multiple "checkpoints" from which to choose, providing a better chance that there will be an intact version of the filesystem to which the filesystem can be reverted or a checkpoint that contains a particular version of the filesystem.

The processing of file system requests is delineated by a series of checkpoints that are scheduled to occur no less frequently than some user-specified interval, such as every 10 seconds. Checkpoints may be taken at other times such as, for example, if more than half of the non-volatile RAM being used for the current checkpoint is full, if the sector cache is becoming full, if the user requests a retained checkpoint (discussed below), or under other appropriate circumstances.

With respect to each successive checkpoint, there is stored, on disk, current file structure information that supersedes previously stored file structure information from the immediately preceding checkpoint. Checkpoints are numbered sequentially and are used to temporally group processing of file requests.

As discussed above, exemplary embodiments of the present invention maintain N DSBs (where N is greater than two, e.g., 16). The DSBs are used to take successive checkpoints.

Thus, at any given time, there is a current (working) version of the filesystem and one or more checkpoint versions of the filesystem. Because the storage system is typically quite dynamic, the current version of the filesystem will almost certainly begin changing almost immediately after taking a checkpoint. For example, filesystem objects may be added, deleted, or modified over time. In order to maintain checkpoints, however, none of the structures associated with stored checkpoints can be permitted to change, at least until a particular checkpoint is deleted or overwritten. Therefore, as objects in the current version of the filesystem are added, deleted, and modified, new versions of object tree structures are created as needed, and the various pointers are updated accordingly.

Figure 11:
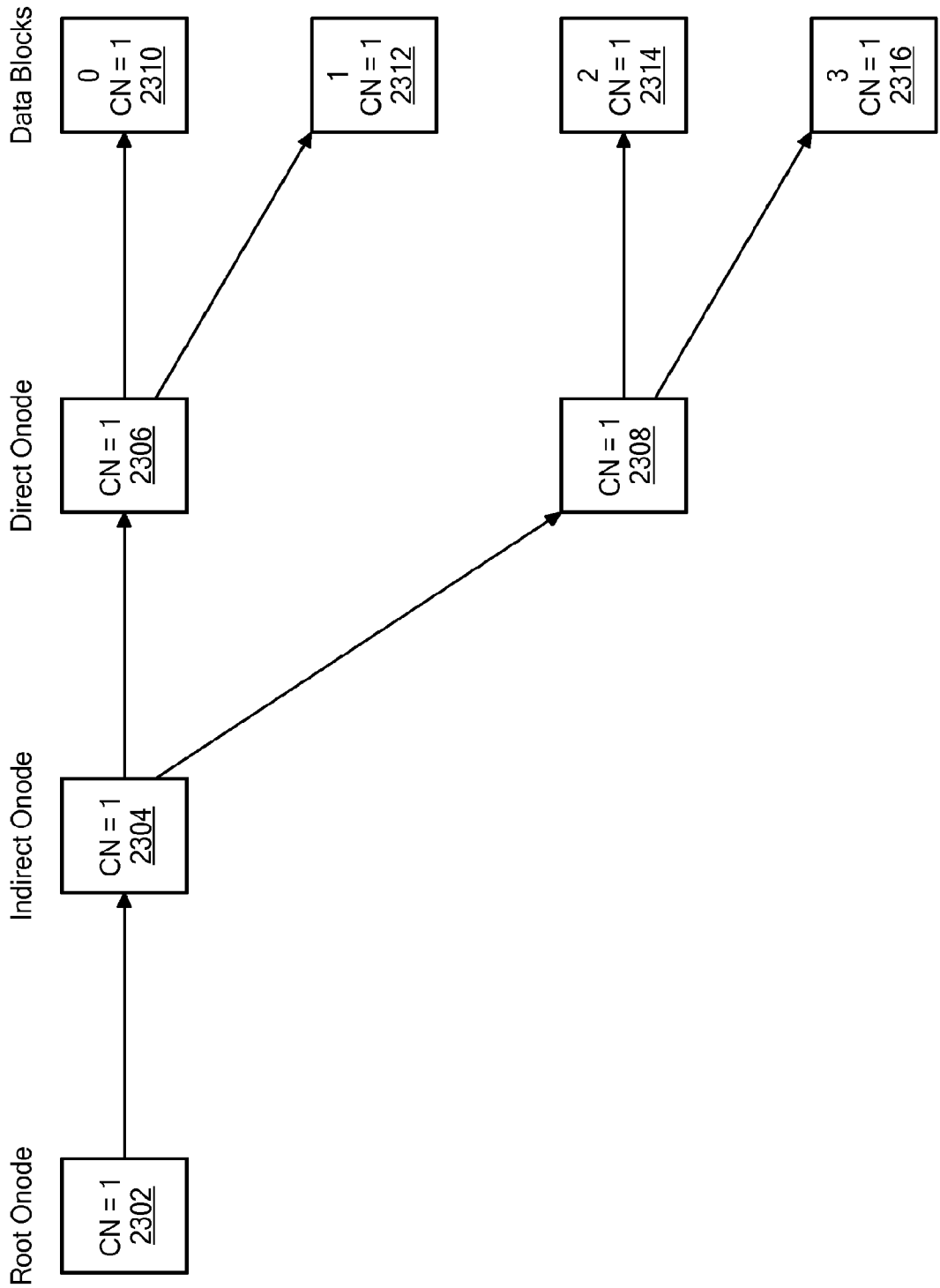
FIG. 11 is a schematic diagram that shows the structure of an exemplary object that includes four data blocks and various onodes at a checkpoint number 1 in accordance with an exemplary embodiment of the present invention.

For example, FIG. 11 schematically shows an object structure for an exemplary object that was created at a checkpoint number 1. The object includes four data blocks, namely data block 0 (2310), data block 1 (2312), data block 2 (2314), and data block 3 (2316). A direct node 2306 includes a pointer to data block 0 (2310) and a pointer to data block 1 (2312). A direct node 2308 includes a pointer to data block 2 (2314) and a pointer to data block 3 (2316). An indirect node 2304 includes a pointer to direct node 2306 and a pointer to direct node 2308. A root node 2302 includes a pointer to indirect node 2304. All nodes and all data blocks are marked with checkpoint number 1.

Figure 12:
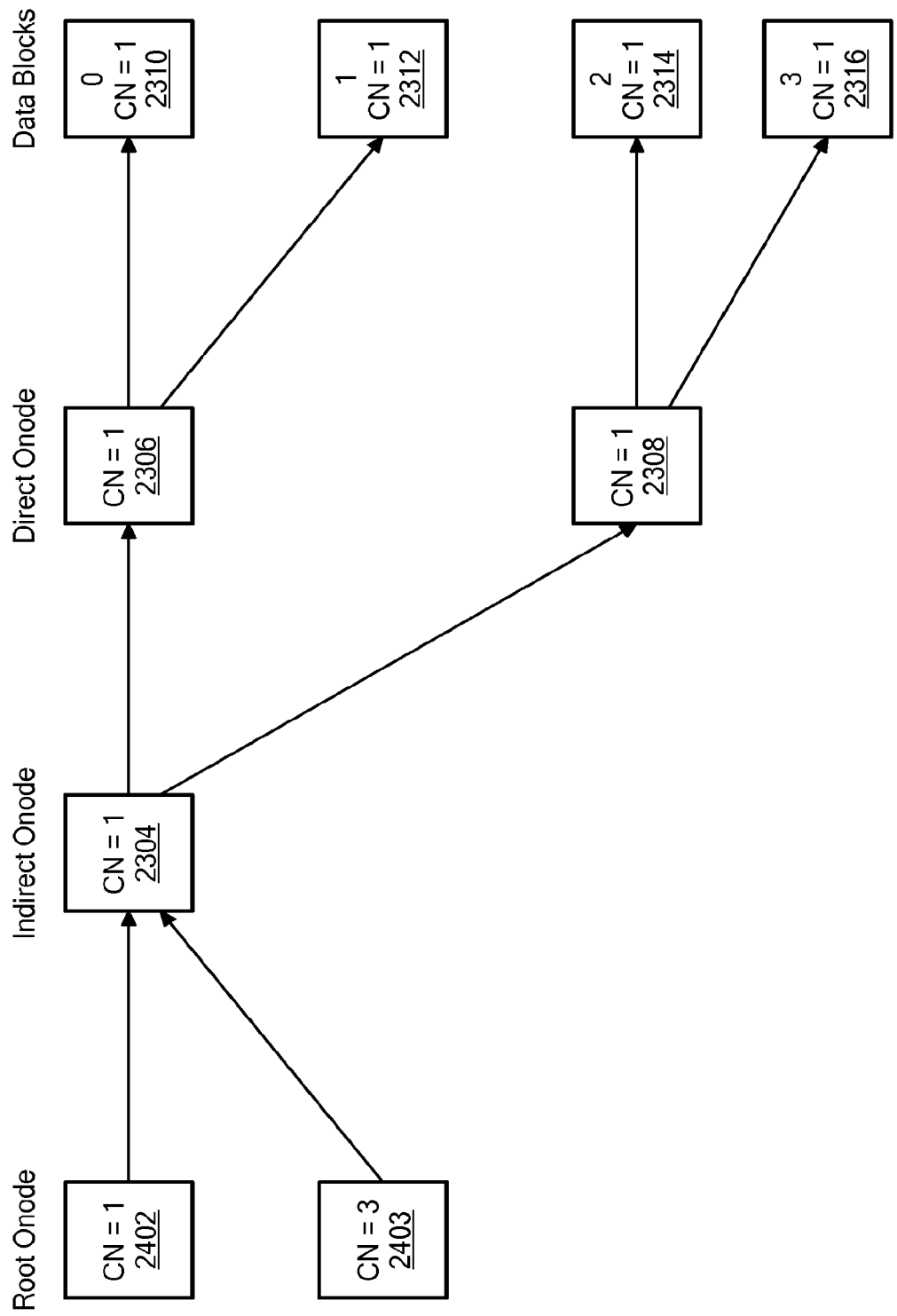
FIG. 12 is a schematic diagram that shows the structure of the exemplary object of FIG. 11 after a new root node is created for the modified object in accordance with an embodiment of the present invention.

Suppose now that data block 0 (2310) is to be modified in checkpoint number 3. Since root node 2402 is part of an earlier checkpoint, it cannot be modified. Instead, the Object Store sub-module of the file server 9002 saves a copy of the old root node 2302 to free space on the disk and marks this new root node with checkpoint number 3 (i.e., the checkpoint at which it was created). FIG. 12 schematically shows the object structure after creation of the new root node 2403. At this point, both root node 2402 and new root node 2403 point to indirect node 2304.

Figure 13:
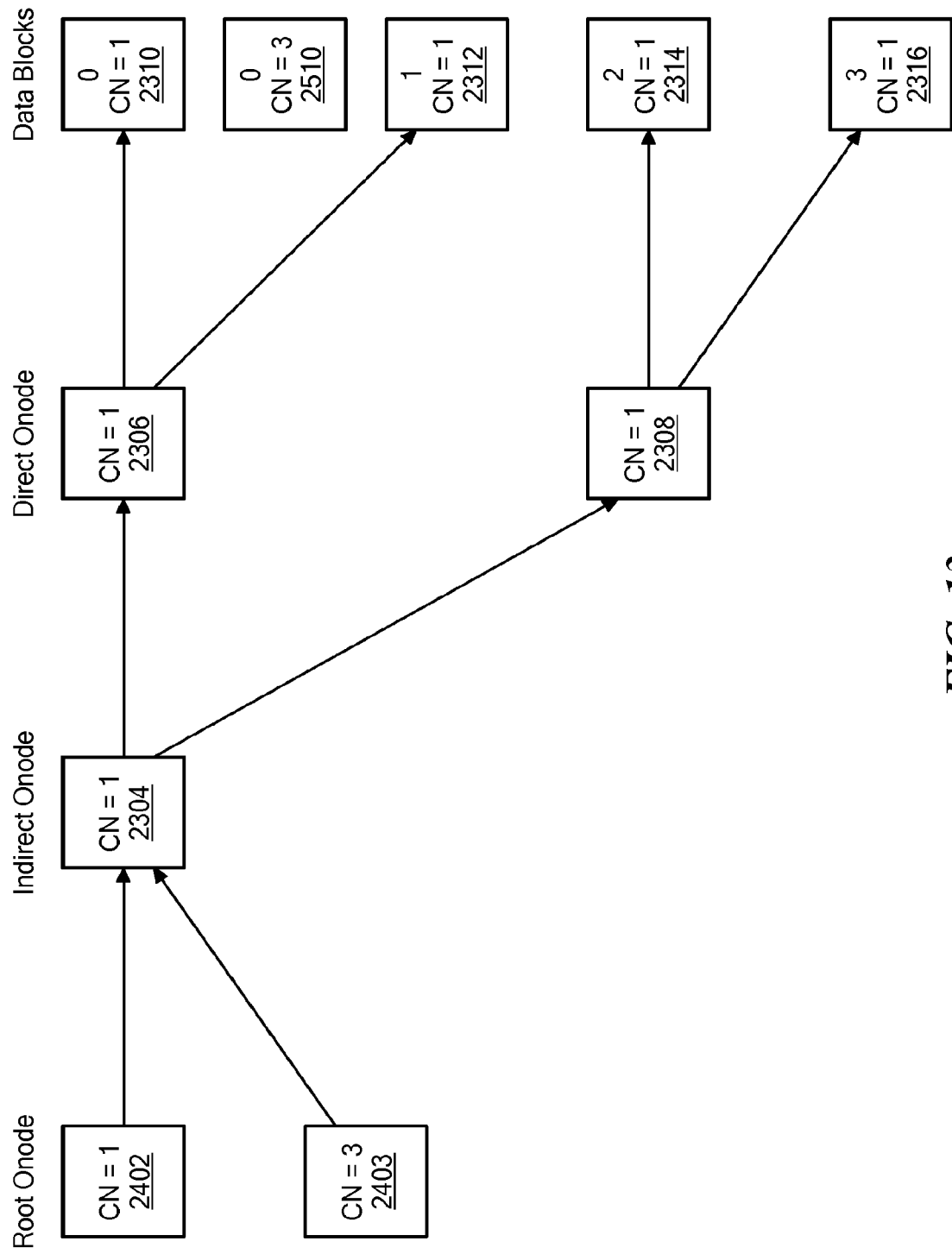
FIG. 13 is a schematic diagram that shows the structure of the exemplary object of FIG. 12 after a modified copy of a data block is created in accordance with an embodiment of the present invention.

The Object Store sub-module then traverses the object structure starting at the root node until it reaches the descriptor for data block 0 (2310). Since data block 0 (2310) is part of an earlier checkpoint, it cannot be modified. Instead, the Object Store sub-module creates a modified copy of data block 2310 in free space on the disk and marks this new data block with checkpoint number 3 (i.e., the checkpoint at which it was created). FIG. 13 schematically shows the object structure after creation of the new data block 2510.

Figure 14:
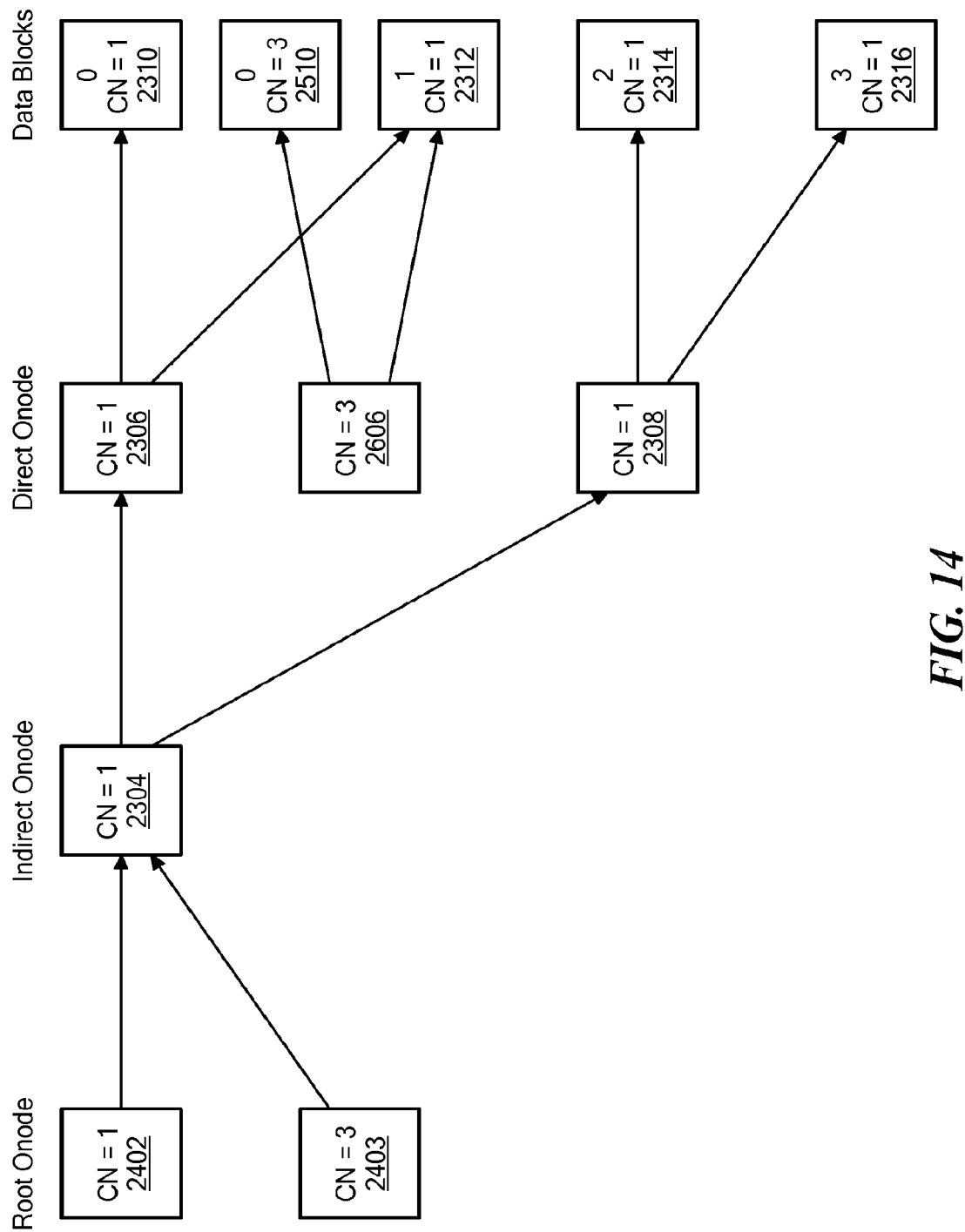
FIG. 14 is a schematic diagram that shows the structure of the exemplary object of FIG. 13 after a new direct onode is created to point to the modified copy of the data block in accordance with an embodiment of the present invention.

The Object Store sub-module now needs to put a pointer to the new data block 2510 in a direct node, but the Object Store sub-module cannot put a pointer to the new data block 2510 in the direct node 2306 because the direct node 2306 is a component of the earlier checkpoint. The Object Store sub-module therefore creates a modified copy of direct node 2306 to free space on the disk including pointers to the new data block 0 (2510) and the old data block 1 (2312) and marks this new direct node with checkpoint number 3 (i.e., the checkpoint at which it was created). FIG. 14 schematically shows the object structure after creation of the new direct node 2606 including pointers to the new data block 0 (2510) and the old data block 1 (2312).

Figure 15:
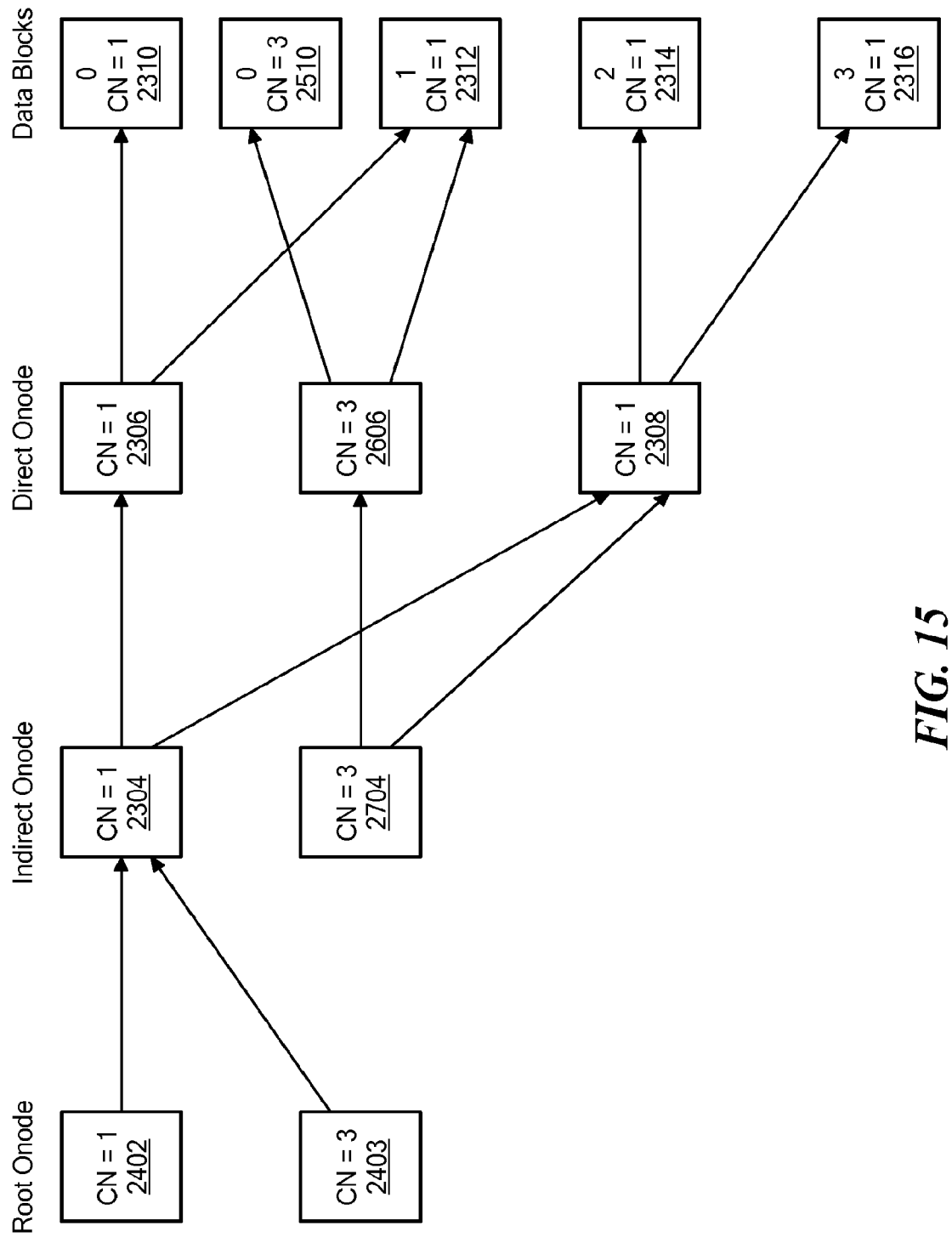
FIG. 15 is a schematic diagram that shows the structure of the exemplary object of FIG. 14 after a new indirect onode is created to point to the new direct onode in accordance with an embodiment of the present invention.

The Object Store sub-module now needs to put a pointer to the new direct node 2606 in an indirect node, but the Object Store sub-module cannot put a pointer to the new direct node 2606 in the indirect node 2304 because the indirect node 2304 is a component of the earlier checkpoint. The Object Store sub-module therefore creates a modified copy of indirect node 2304 with pointers to the new direct node 2606 and the old direct node 2308. FIG. 15 schematically shows the object structure after creation of the new indirect node including pointers to the new direct node 2606 and the old direct node 2308.

Figure 16:
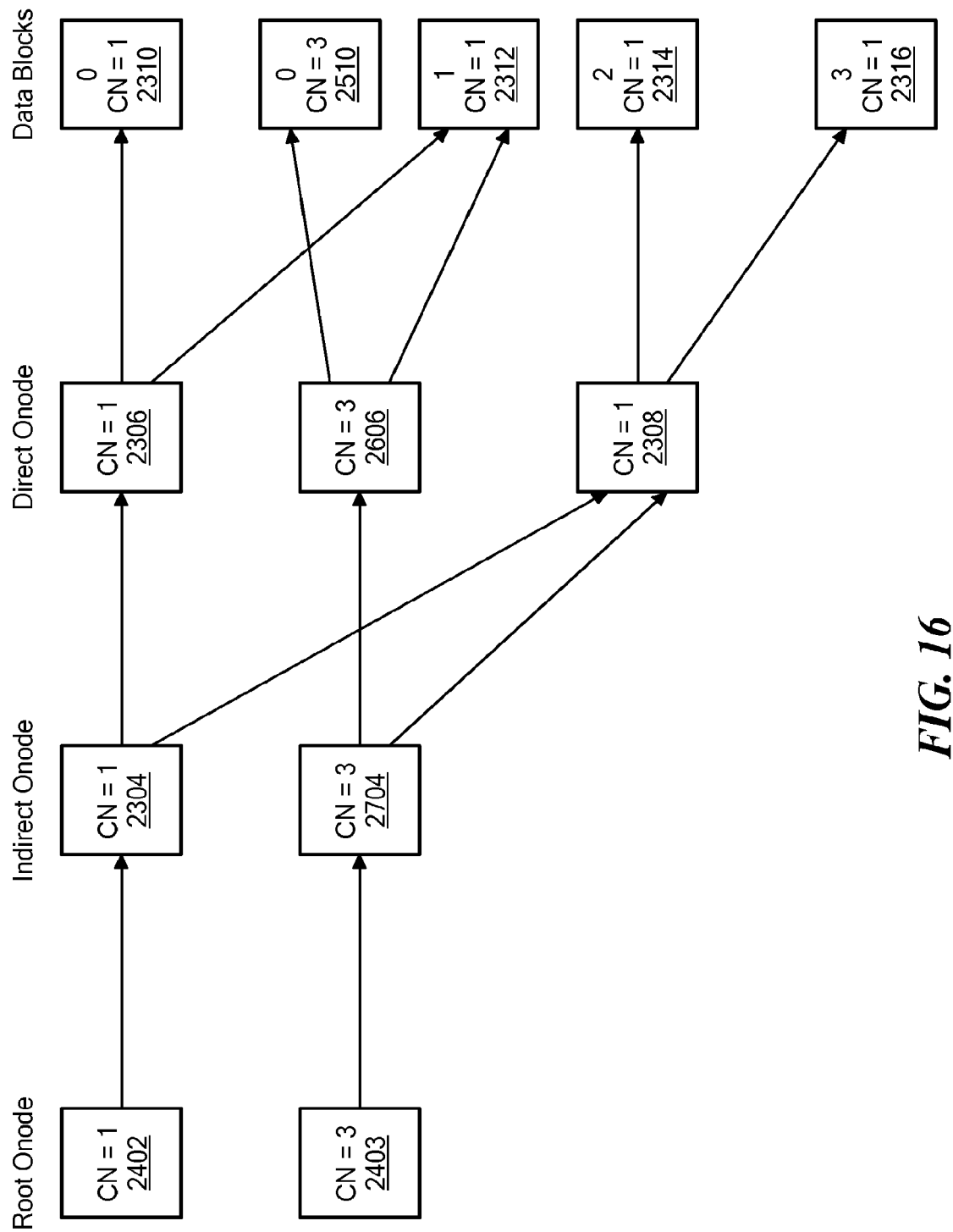
FIG. 16 is a schematic diagram that shows the structure of the exemplary object of FIG. 15 after the new root node is updated to point to the new indirect onode in accordance with an embodiment of the present invention.

Finally, the Object Store sub-module writes a pointer to the new indirect node 2704 in the new root node 2403. FIG. 16 schematically shows the object structure after the pointer to the new indirect node 2704 is written into the new root node 2403.

It should be noted that, after modification of data block 0 is complete, blocks 2402, 2304, 2306, and 2310 are components of the checkpoint 1 version but are not components of the current checkpoint 3 version of the object; blocks 2308, 2312, 2314, and 2316 are components of both the checkpoint 1 version and the current checkpoint 3 version of the object; and blocks 2403, 2704, 2606, and 2510 are components of the current checkpoint 3 version of the object but are not components of the checkpoint 1 version.

It should also be noted that the new node do not necessarily need to be created in the order described above. For example, the new root node could be created last rather than first.

Thus, when a filesystem object is modified, the changes propagate up through the object tree structure so that a new root node is created for the modified object. A new root node would only need to be created for an object once in a given checkpoint; the new root node can be revised multiple times during a single checkpoint.

In order for the new version of the object to be included in the current version of the filesystem, the current indirection object is modified to point to the root node of the modified object rather than to the root node of the previous version of the object. For example, with reference again to FIG. 16, the current indirection object would be updated to point to root node 2403 rather than to root node 2402 for the object number associated with this object.

Similarly, if a new object is created or an existing object is deleted in the current version of the filesystem, the current indirection object is updated accordingly. For example, if a new object is created, the indirection object is modified to include a pointer to the root node of the new object. If an existing object is deleted, the indirection object is modified to mark the corresponding object number as free.

Since the indirection object is also a tree structure having a root node, modification of the indirection object also propagates up through the tree structure so that a new root node would be created for the modified indirection object. Again, a new root node would only need to be created for the indirection object once in a given checkpoint; the new root node can be revised multiple times during a single checkpoint.

Thus, when a new version of the indirection object is created during a particular checkpoint, the DSB associated with that checkpoint is updated to point to the new root node for the modified indirection object. Therefore, each version of the filesystem (i.e., the current version and each checkpoint version) generally will include a separate version of the indirection object, each having a different indirection object root node (but possibly sharing one or more indirect nodes, direct nodes, and/or data blocks).

In one exemplary embodiment, the DSBs are treated as a circular list, and checkpoints continue to be taken at scheduled intervals such that, during the steady state, each new checkpoint "overwrites" an old checkpoint so that the old version of the filesystem represented by the "overwritten" checkpoint is lost.

Figure 17:
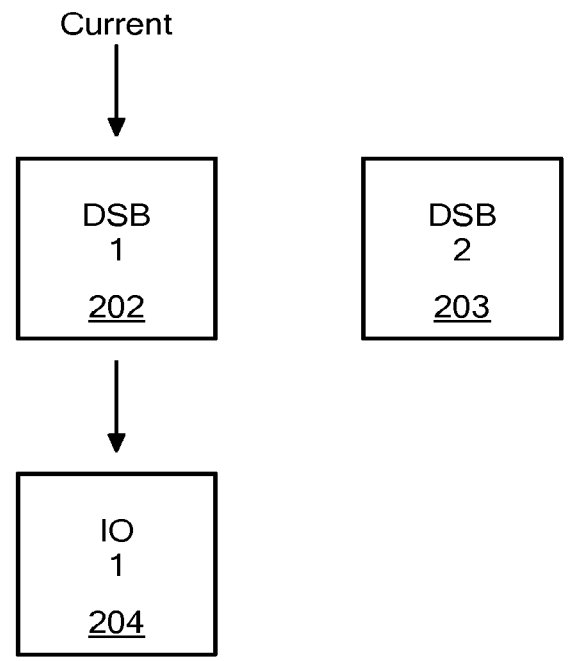
FIG. 17 is a schematic diagram showing various filesystem structures prior to the taking of a checkpoint, in accordance with an exemplary embodiment of the present invention using a circular list of DSBs to record checkpoints.

FIG. 17 is a schematic diagram showing various filesystem structures prior to the taking of a checkpoint, in accordance with an exemplary embodiment of the present invention. Specifically, two DSBs numbered 202 and 203 are shown. DSB 202 is associated with the current version of the filesystem and includes a pointer to the root node of the current version of the indirection object 204. DSB 203 is the next available DSB.

Figure 18:
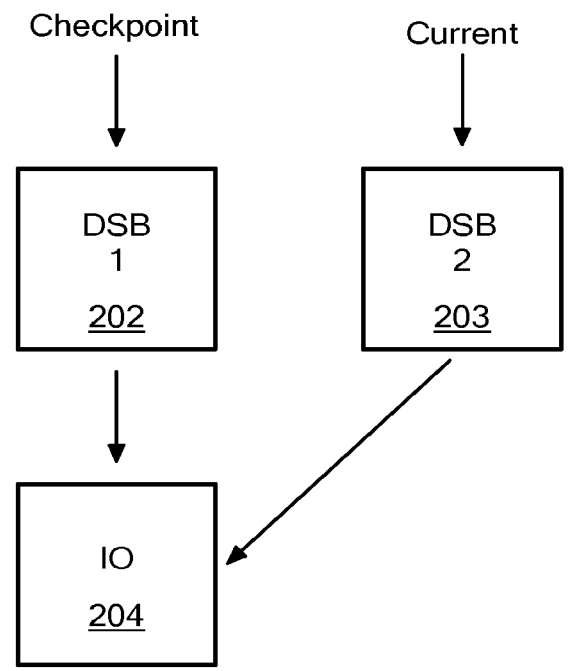
FIG. 18 is a schematic diagram showing the various filesystem structures of FIG. 17 after a checkpoint is taken, in accordance with an exemplary embodiment of the present invention using a circular list of DSBs to record checkpoints.

In order to create a checkpoint from the current version of the filesystem, the next DSB in the circular list (i.e., DSB 203 in this example) is initialized for the new checkpoint. Among other things, such initialization includes writing the next checkpoint number into DSB 203 and storing a pointer to the root node of indirection object 204 into DSB 203. FIG. 18 is a schematic diagram showing the various filesystem structures after a checkpoint is taken, in accordance with an exemplary embodiment of the present invention. At this point, DSB 202 represents the most recent checkpoint version of the filesystem, while DSB 203 represents the current (working) version of the filesystem.

Figure 19:
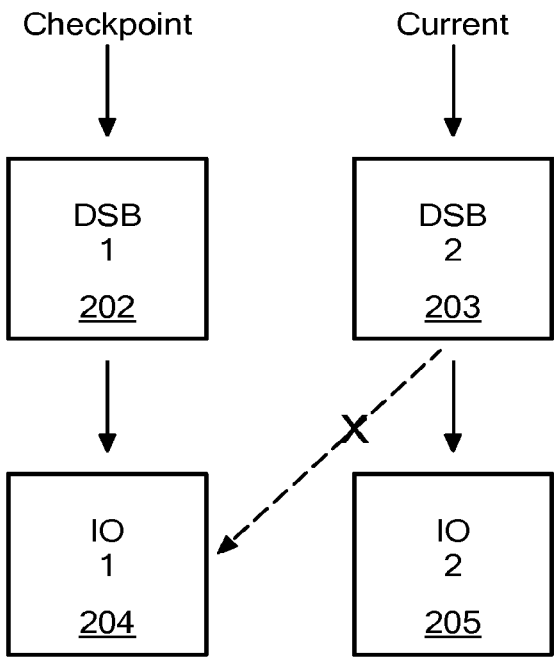
FIG. 19 is a schematic diagram showing the various filesystem structures of FIG. 18 after modification of the indirection object, in accordance with an exemplary embodiment of the present invention using a circular list of DSBs to record checkpoints.

As discussed above, the current version of the filesystem may change as objects are created, modified, and deleted. Also, as discussed above, when the current version of the filesystem changes, a new version of the indirection object (having a new root node) is created. Consequently, when the current version of the indirection object changes after a checkpoint is taken as depicted in FIG. 18, such that a new indirection object root node is created, the DSB for the current filesystem version (i.e., DSB 203 in FIG. 18) is updated to point to the new indirection object root node rather than to the prior indirection object root node. FIG. 19 is a schematic diagram showing the various filesystem structures after modification of the indirection object, in accordance with an exemplary embodiment of the present invention. Here, DSB 202, which is associated with the checkpoint version of the filesystem, points to the checkpoint version of the indirection object 204, while DSB 203, which is associated with the current version of the filesystem, points to the root node of new indirection object 205.

As discussed above, checkpoints generally are taken at regular intervals such that multiple versions of the filesystem are maintained over time. At each checkpoint, the current (working) version of the filesystem moves to the next successive DSB in the circular list. When a particular checkpoint version is deleted from the system (e.g., because its DSB has been re-used), storage associated with the deleted checkpoint can be recovered in due course, for example, using a background task that identifies and frees storage that is no longer being used.

In one alternative embodiment, a particular DSB may be reused as the current DSB for successive checkpoints, with the other DSBs used to save checkpoint versions of the filesystem.

Figure 20:
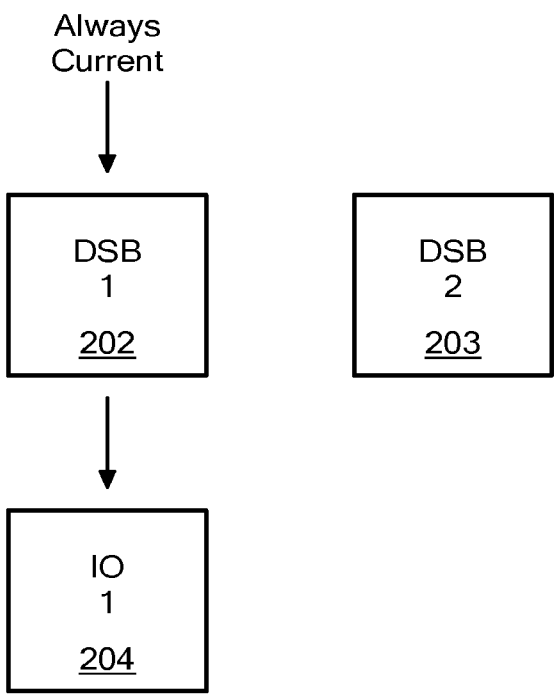
FIG. 20 is a schematic diagram showing various filesystem structures prior to the taking of a checkpoint, in accordance with an exemplary embodiment of the present invention in which one DSB is reused to create successive checkpoints.

FIG. 20 is a schematic diagram showing various filesystem structures prior to the taking of a checkpoint, in accordance with an exemplary embodiment of the present invention. Specifically, two DSBs numbered 202 and 203 are shown. DSB 202 is associated with the current version of the filesystem and includes a pointer to the root node of the current version of the indirection object 204. DSB 203 is the next available DSB.

In order to create a checkpoint from the current version of the filesystem, the next DSB 203 is initialized for the new checkpoint. Among other things, such initialization includes writing the next checkpoint number into DSB 203 and storing a pointer to the root node of indirection object 204 into DSB 203. FIG. 18 is a schematic diagram showing the various filesystem structures after a checkpoint is taken, in accordance with an exemplary embodiment of the present invention. At this point, DSB 203 represents the most recent checkpoint version of the filesystem, while DSB 202 continues to represent the current (working) version of the filesystem.

Figure 21:
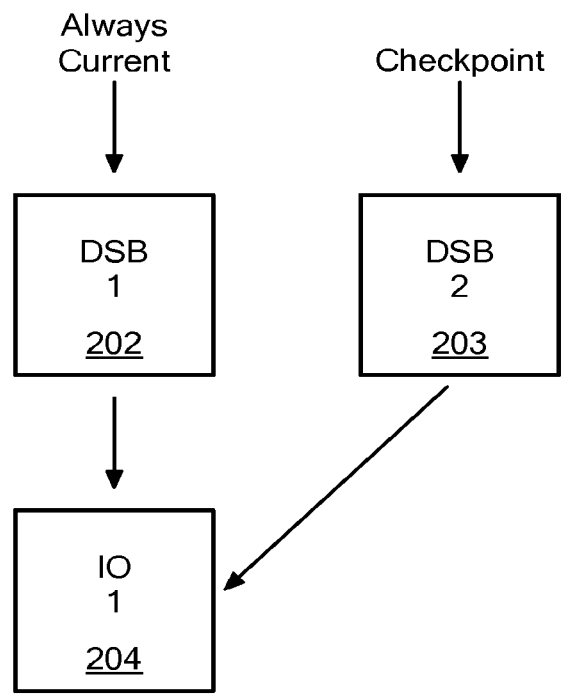
FIG. 21 is a schematic diagram showing the various filesystem structures of FIG. 20 after a checkpoint is taken, in accordance with an exemplary embodiment of the present invention in which one DSB is reused to create successive checkpoints.
Figure 22:
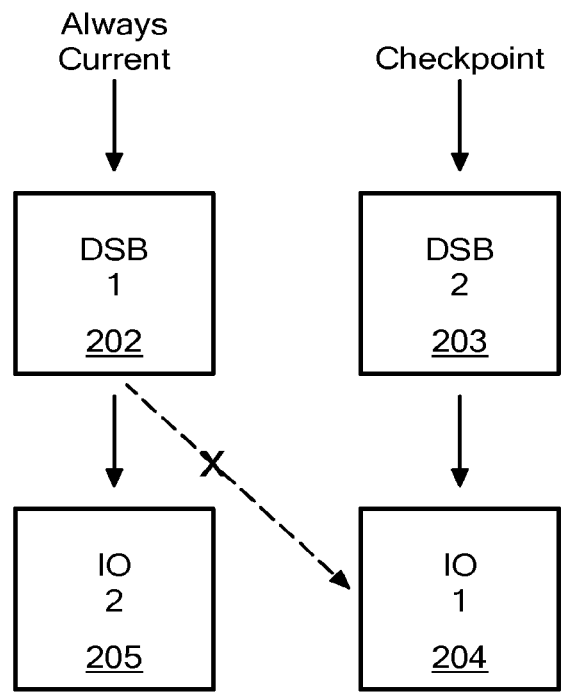
FIG. 22 is a schematic diagram showing the various filesystem structures of FIG. 21 after modification of the indirection object, in accordance with an exemplary embodiment of the present invention in which one DSB is reused to create successive checkpoints.

As discussed above, the current version of the filesystem may change as objects are created, modified, and deleted. Also, as discussed above, when the current version of the filesystem changes, a new version of the indirection object (having a new root node) is created. Consequently, when the current version of the indirection object changes after a checkpoint is taken as depicted in FIG. 21, such that a new indirection object root node is created, the DSB for the current filesystem version (i.e., DSB 202 in FIG. 21) is updated to point to the new indirection object root node rather than to the prior indirection object root node. FIG. 22 is a schematic diagram showing the various filesystem structures after modification of the indirection object, in accordance with an exemplary embodiment of the present invention. Here, DSB 203, which is associated with the checkpoint version of the filesystem, points to the checkpoint version of the indirection object 204, while DSB 202, which continues to be associated with the current version of the filesystem, points to the root node of new indirection object 205.

When a volume is mounted, the system will normally want to go back to the last valid checkpoint. There may be times, however, when the system or user may choose to revert to an earlier valid checkpoint. In embodiments of the present invention, the file server 9002 is capable of maintaining more that one checkpoint, so there may be multiple versions of the filesystem to which the filesystem can be reverted. Utilities can be provided to allow an operator to examine the contents of the various checkpoint versions in order to facilitate selection of a checkpoint version for reverting the filesystem.

Even though N checkpoints may be maintained in the system (where N is typically greater than two and may be user-configurable), a user-triggered mechanism may be provided for retaining a checkpoint such that it will remain valid and accessible (read-only) until the user chooses to delete it. A retained checkpoint is essentially a read-only version of the file system structure at a particular checkpoint. Multiple retained checkpoints can be taken, and mechanisms are included for deleting a selected retained checkpoint or reverting the file system to a selected retained checkpoint (for example, to return the file system to a known state following a catastrophe). As long as a retained checkpoint remains active, the nodes and data blocks that comprise the retained checkpoint cannot be modified or returned to free space. It should be noted that a node or data block can be a component of multiple retained checkpoints, and a particular node or data block cannot be returned to free space as long as the node or data block is a component of at least one retained checkpoint.

In an exemplary embodiment, taking a retained checkpoint involves, among other things, saving a copy of the corresponding DSB in free space on disk and storing a reference to the stored DSB copy in the retained checkpoint configuration object. As long as a retained checkpoint is stored in the filesystem, structures associated with the retained checkpoint cannot be deleted. This is true even if the checkpoint from which the retained checkpoint was taken has been overwritten. In an exemplary embodiment, the file server 9002 includes mechanisms to prevent structures associated with retained checkpoints from being deleted.

File Cloning

In certain embodiments of the present invention, a file cloning mechanism is employed to allow for quickly creating copies (clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. Some characteristics of such file cloning include:

The data stream of a filesystem object can be effectively cloned quickly and in a relatively fixed amount of time regardless of the size of the source object's data stream, since none of the user data blocks from which the data stream is comprised need to be copied. Also, none of the metadata blocks describing the data stream (i.e., the indirect/direct onodes) needs to be copied. A very small and constant number of metadata blocks are mutated.

The complexity of handling I/O to a cloned/clone object is equivalent to a regular object.

The number of times a file or clone can be cloned is limited only by the amount of free space in the file system.

The number of clones a file system can support is limited only by the amount free space in the file system.

This file cloning has an inherent file de-duplication characteristic in that, rather than creating full copies of a source file and later performing de-duplication, the clones are essentially created as de-duplicated files that share data and metadata blocks with the source file.

Corruption of a shared block would affect multiple files, although data corruption is mitigated through redundant storage (i.e., the RAID controller) and other mechanisms.

In exemplary embodiments, a file system object is cloned by first creating a new object that represents a read-only clone (snapshot) of the source object, referred to hereinafter as a "data-stream-snapshot" object or "DSS," and then creating a mutable clone of the object. The block pointers and onode block pointer in the root onode of the clone objects are initially set to point to the same blocks as the source object. Certain metadata from the source object (e.g., file times, security, etc.) and named data streams are not copied to the clone object. Metadata is maintained in the source object and in the clone objects to link the data-stream-snapshot object with the source object and the mutable clone object and also to link the source object and the mutable clone object with the data-stream-snapshot object. In exemplary embodiments, the data-stream-snapshot object is a "hidden" object in that it is not visible to the filesystem users. Both the source object and the mutable clone object effectively become writable versions of the DSS object and effectively store their divergences from the DSS object.

Before creating the data-stream-snapshot object, the system preferably ensures that the source object is quiescent. In an exemplary embodiment, this involves the following steps:

Step A1. Lock the source object against mutations.

Step A2. Perform a filesystem checkpoint, which effectively serializes the creation of clones on a given filesystem (although the creation rate will be limited by the rate at which the filesystem can commit the previous checkpoint to disk such that storage-side delays will result in longer create times).

Then, after completion of the checkpoint, the system creates the data-stream-snapshot object, which involves the following steps:

Step A3. Create a data-stream-snapshot object.

Step A4. Copy the block pointers from the source object's root onode to the data-stream-snapshot object's root onode.

Step A5. Record the current checkpoint number in the source object's root onode. This is the object's cloned-in-checkpoint number ("CCN"); it defines the earliest checkpoint in which the object's data stream can diverge from its associated data-stream-snapshot object's data stream.

The system also maintains the following metadata to associate the source object with the data-stream-snapshot object:

Step A6. The handle of the data-stream-snapshot object is recorded in the source object's metadata.

Step A7. A reference count and list of objects referencing the data-stream-snapshot object is recorded in the data-stream-snapshot object's metadata.

If the source object was already a clone (i.e., a clone is being cloned) then there are two additional steps between steps 4 and 5:

Step A4*a*. Associate the new data-stream-snapshot object with the source file's current data-stream-snapshot object.

Step A4*b*. Record the source file's current cloned-in-checkpoint number in the new data-stream-snapshot object's root onode.

Further objects that have a mutable clone of the data-stream-snapshot object's data stream can be created as follows:

Step B1. Create a new file system object.

Step B2. Copy the block pointers from the data-stream-snapshot object's root onode to the new object's root onode.

Step B3. Record the current checkpoint number in the new object's root onode.

Step B4. Record the handle of the data-stream-snapshot object in the new object's metadata.

Step B5. Increment the data-stream-snapshot object's reference count and add the new object's handle to the data-stream-snapshot object's list of references.

It should be noted that the cloned-in-checkpoint number (CCN) is distinct from an object's checkpoint number (labelled "CN" in FIG. 11), which records the checkpoint of the last modification of the object. Both are stored in the object root onode.

When modifying a user data or metadata block, the filesystem considers whether the block has already diverged from the clone object's associated data-stream-snapshot object, when deciding whether the block must be written to new space:

A change to a user/metadata block through a pointer with a checkpoint number less than the clone's clone-in-checkpoint number (an un-diverged block) must be written to new space.

A change to a user/metadata block through a pointer with a checkpoint number greater than or equal to the clone's cloned-in-checkpoint number (a diverged block) follows the usual rules for objects in the "live" filesystem substantially as described above.

Some of the file cloning concepts described above can be demonstrated by the following examples, which are based on the filesystem object represented in FIG. 11.

Figure 23:
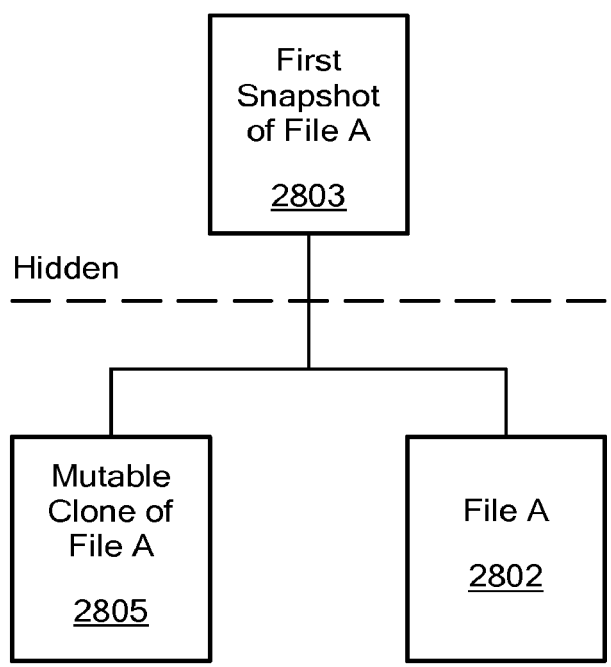
FIG. 23 schematically shows the relationship between the source object (FileA) 2802, the hidden data-stream-snapshot object 2803, and the mutable copy 2805, in accordance with an exemplary embodiment of the present invention.

FIG. 23 schematically shows the relationship between the source object (FileA) 2802, the hidden data-stream-snapshot object 2803, and the mutable clone 2805, in accordance with an exemplary embodiment of the present invention.

Figure 24:
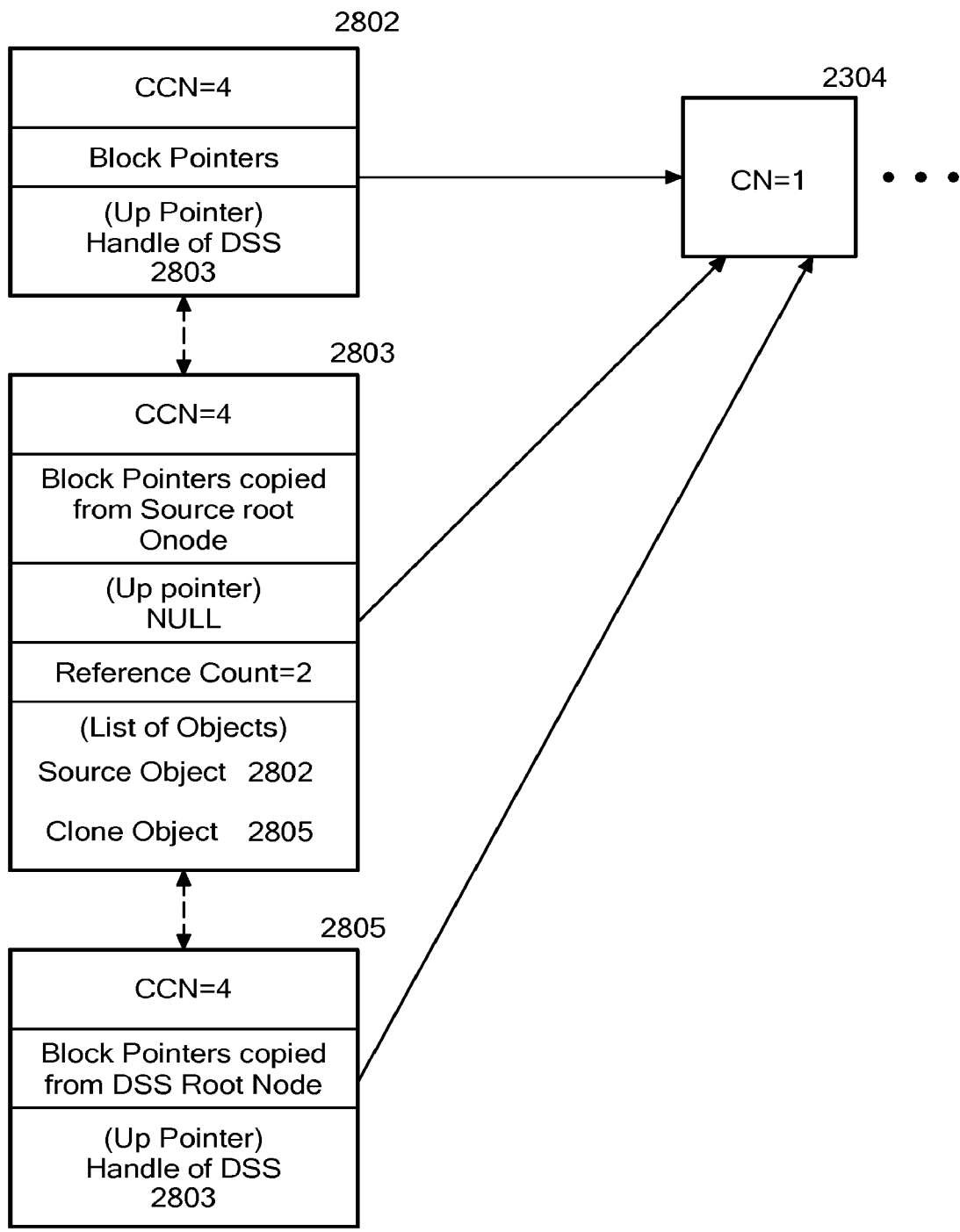
FIG. 24 schematically shows the objects 2802, 2803, and 2805 after cloning of the filesystem object represented in FIG. 11 at a conceptual checkpoint number 4, in accordance with an exemplary embodiment of the present invention.

FIG. 24 schematically shows the objects 2802, 2803, and 2805 after cloning of the filesystem object represented in FIG. 11 at a conceptual checkpoint number 4, in accordance with an exemplary embodiment of the present invention.

As discussed above, after the source object is locked and the checkpoint is taken (steps A1 and A2), the data-stream-snapshot object 2803 is created (step A3), and the block pointers from the source object's root onode 2302 are copied to the data-stream-snapshot object 2803 root onode (step A4). The current checkpoint number is recorded in the source object 2802 root onode (step A5). The handle of the data-stream-snapshot object 2803 is recorded in the source object 2802 metadata (step A6). A reference count and list of objects referencing the data-stream-snapshot object 2803 is recorded in the data-stream-snapshot object 2803 metadata (step A7). At this point, only the source object 2802 references the data-stream-snapshot object 2803, and the reference count is (temporarily) set to one.

Also as discussed above, the mutable clone 2805 is created (step B1), and the block pointers from the data-stream-snapshot object 2803 root onode are copied to the object 2805 root onode (step B2). The current checkpoint number is recorded in the object 2805 root onode (step B3). The handle of the data-stream-snapshot object 2803 is recorded in the object 2805 metadata (step B4). The reference count in the data-stream-snapshot object 2803 is incremented and the handle of the object 2805 is recorded in the data-stream-snapshot object 2803 list of references (step B5).

It should be noted that the dashed double-sided arrow between 2802 and 2803 represents the linking between those two structures, and similarly the dashed double-sided arrow between 2803 and 2805 represents the linking between those two structures.

It should be noted that when the mutable clone 2805 is created, information such as the block pointers could be copied from the source object 2802 rather than from the DSS object 2803, although copying from the DSS object 2803 is preferred and may allow the source object 2803 to be released from the quiescent state sooner (e.g., after creation of the DSS object 2803 but before creation of the mutable clone 2805).

Figure 25:
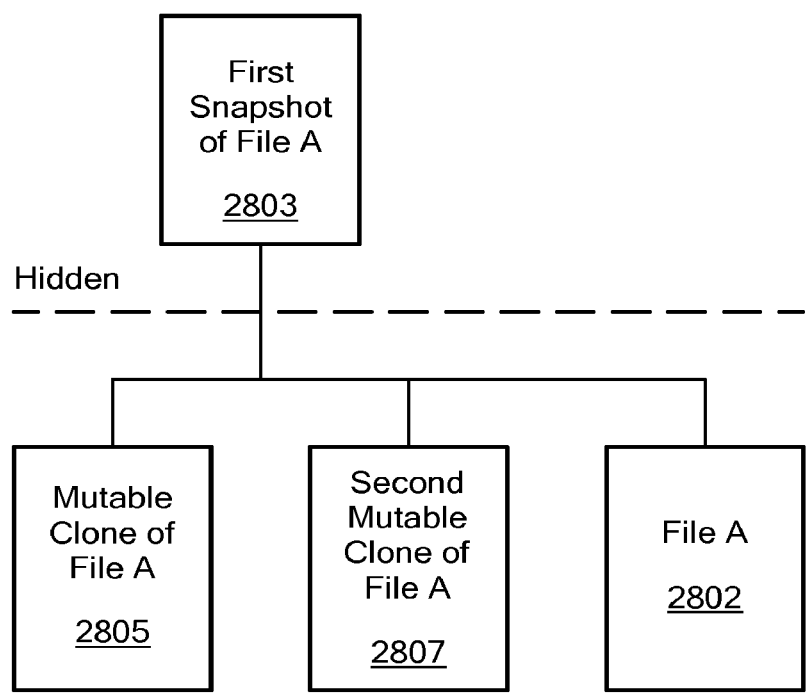
FIG. 25 schematically shows the relationship between the source object (FileA) 2802, the hidden data-stream-snapshot object 2803, and two mutable copies 2805 and 2807, in accordance with an exemplary embodiment of the present invention.

If the source object 2802 is cloned again prior to being modified, a second mutable clone is created. FIG. 25 schematically shows the relationship between the source object (FileA) 2802, the hidden data-stream-snapshot object 2803, and two mutable clones 2805 and 2807, in accordance with an exemplary embodiment of the present invention.

Figure 26:
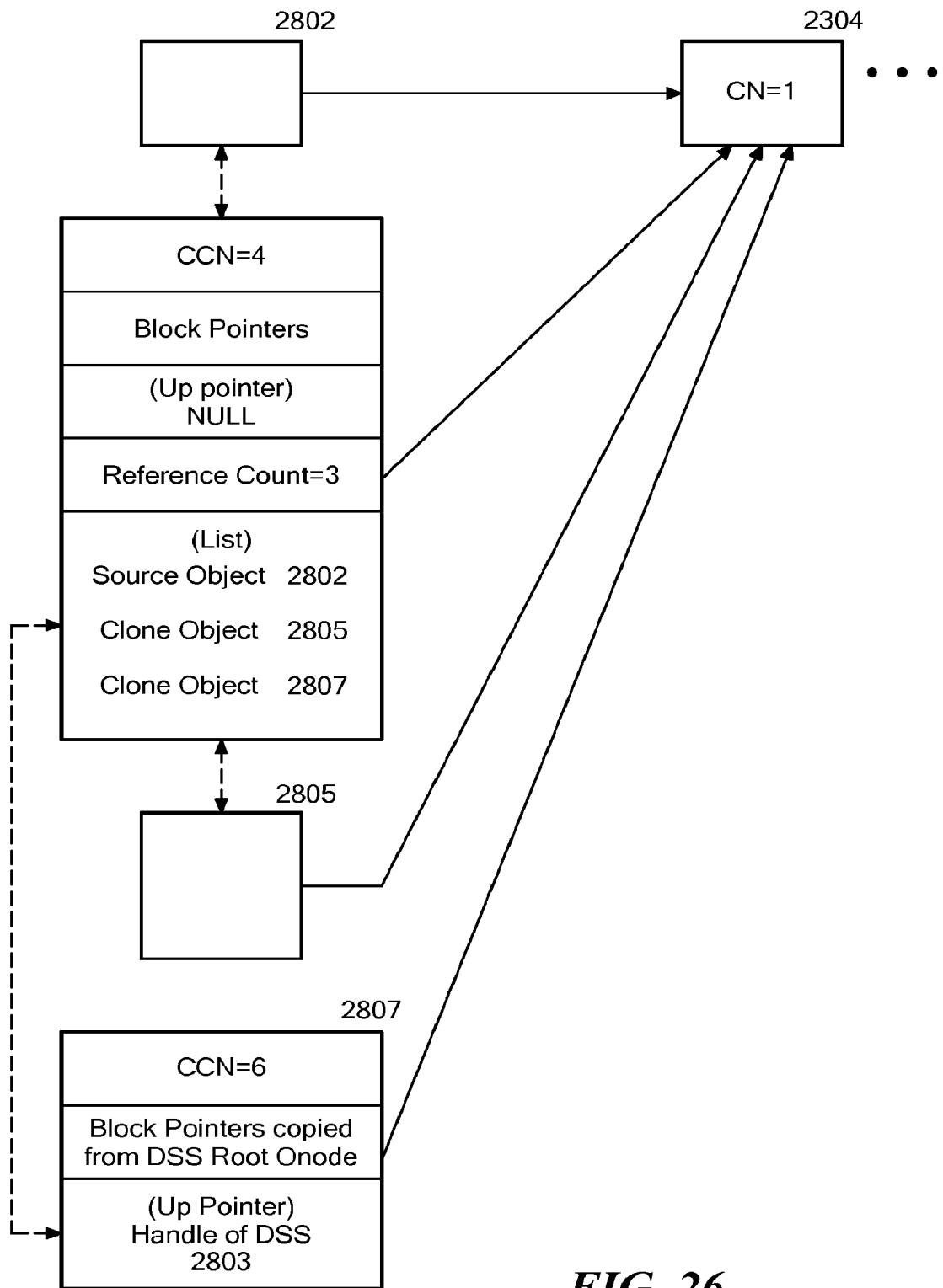
FIG. 26 schematically shows the objects 2802, 2803, 2805, and 2807 after cloning of the second mutable copy at a conceptual checkpoint number 6, in accordance with an exemplary embodiment of the present invention.

FIG. 26 schematically shows the objects 2802, 2803, 2805, and 2807 after creation of the second mutable clone at a conceptual checkpoint number 6, in accordance with an exemplary embodiment of the present invention. Specifically, the second mutable clone 2807 is created, and the block pointers from the data-stream-snapshot object 2803 root onode are copied to the object 2807 root onode. The current checkpoint number is recorded in the object 2807 root onode. The handle of the data-stream-snapshot object 2803 is recorded in the object 2807 metadata. The reference count in the data-stream-snapshot object 2803 is incremented and the handle of the object 2807 is recorded in the data-stream-snapshot object 2803 list of references.

Since the source object 2802 is effectively a mutable copy of the data-stream-snapshot object 2803, the source object 2802 may be modified over time, which causes the data stream of the source object 2802 to diverge from the data streams of the data-stream-snapshot object and other file clones. For example, with reference again to FIG. 24 and the object structures shown in FIGS. 11-16, modification of data block 0 (2310) of the source object rooted at 2802 in, say, a conceptual checkpoint 5, would result in a divergent tree structure with the root onode 2802 pointing to the new indirect onode (similar to the way root onode 2403 ends up pointing to indirect onode 2704 when the object shown in FIG. 11 is modified in a conceptual checkpoint 3 as shown in FIGS. 12-16), with root onodes 2803 and 2805 continuing to point to indirect onode 2304. Similarly, mutable clones of the data-stream-snapshot object may be modified over time, which causes the data streams of the mutable copies to diverge from the data streams of the data-stream-snapshot object and other clones.

If, after the source object is modified, a copy of the modified source object is made, then a second data-stream-snapshot object is created for the modified source object using the process described above including the additional steps A4a and A4b, and then a mutable clone of the second data-stream-snapshot object is created.

Figure 27:
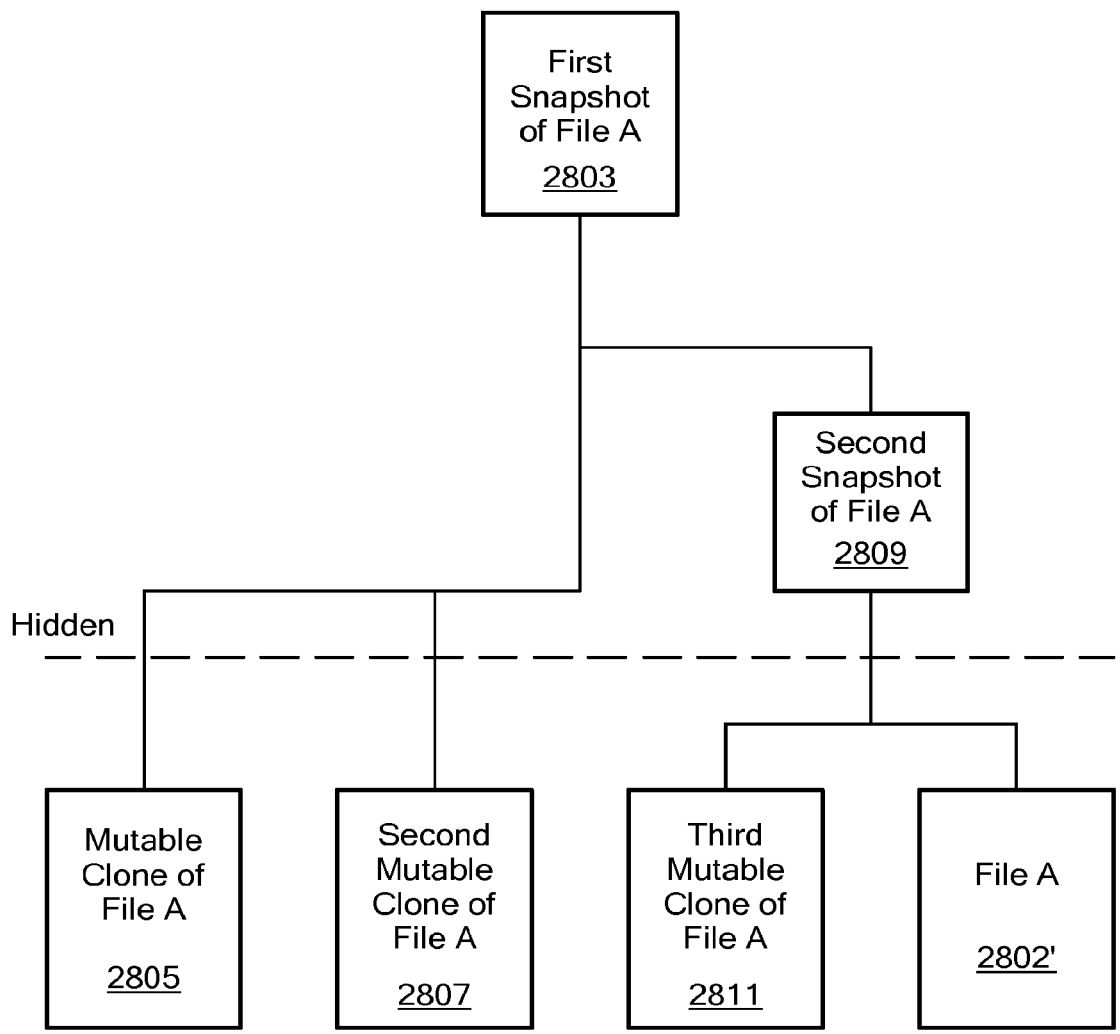
FIG. 27 schematically shows the relationship between the modified source object 2802' (with the apostrophe representing the modified version of the source object), the first data-stream-snapshot object 2803 with the two original source object clones 2805 and 2807, the second data-stream-snapshot object 2809, and the mutable copy 2811 of the second data-stream-snapshot object 2809.

FIG. 27 schematically shows the relationship between the modified source object 2802' (with the apostrophe representing the modified version of the source object), the first data-stream-snapshot object 2803 with the two original source object clones 2805 and 2807, the second data-stream-snapshot object 2809, and the mutable clone 2811 of the second data-stream-snapshot object 2809. As can be seen, the data-stream-snapshot objects 2803 and 2809 are logically linked hierarchically.

Figure 28:
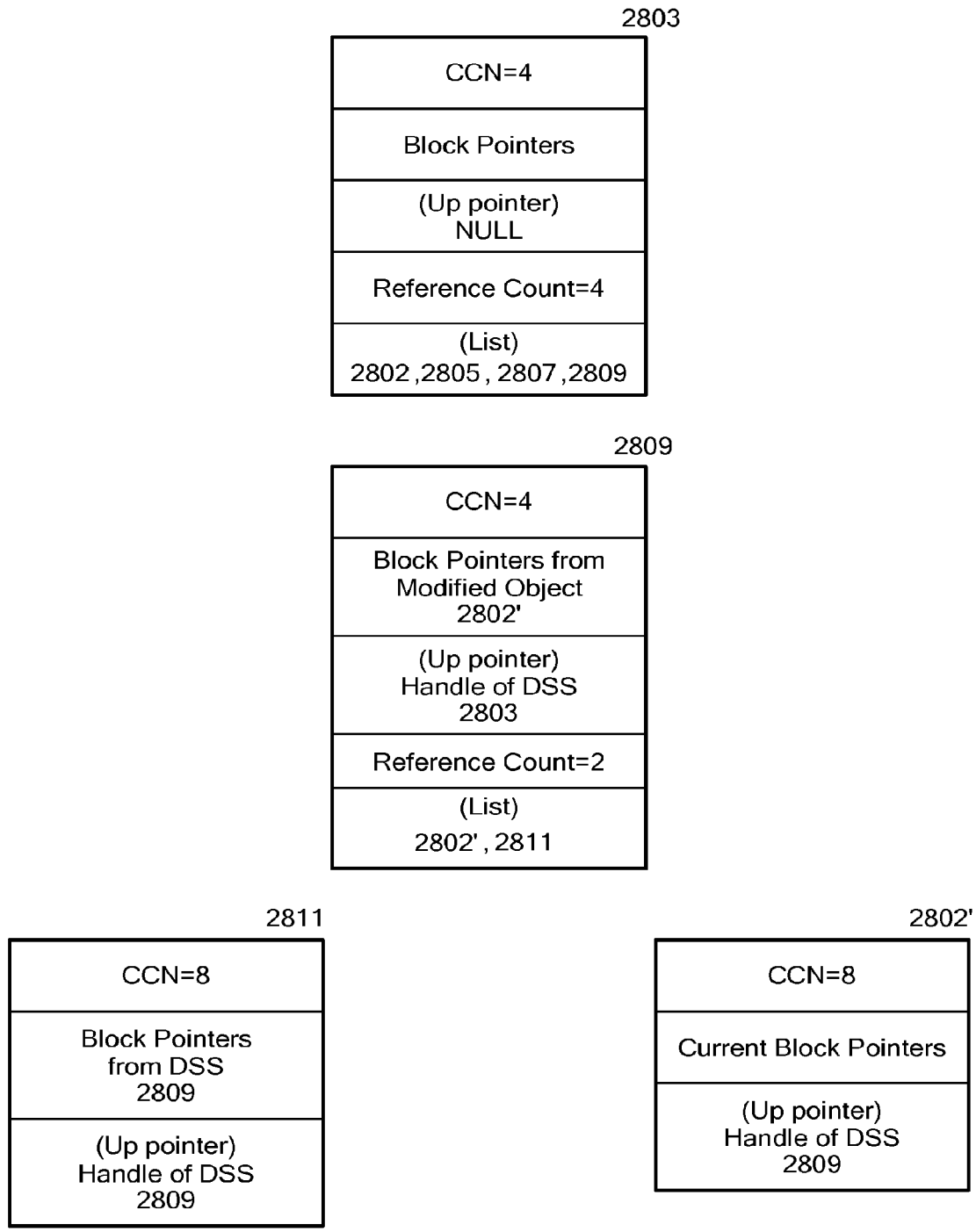
FIG. 28 schematically shows the objects 2802', 2803, 2809, and 2811 after cloning of the modified source object 2802' at a conceptual checkpoint number 8, in accordance with an exemplary embodiment of the present invention.

FIG. 28 schematically shows the objects 2802', 2803, 2809, and 2811 after cloning of the modified source object 2802' at a conceptual checkpoint number 8, in accordance with an exemplary embodiment of the present invention.

As discussed above, the data-stream-snapshot object 2809 is created (step A3), and the block pointers from the source object 2802' root onode are copied to the data-stream-snapshot object 2809 root onode (step A4). The data-stream-snapshot object 2809 is associated with the source object's current data-stream-snapshot object 2803 (step A4a), specifically by recording the handle of DSS 2803 in the DSS 2809, recording the handle of DSS 2809 in the DSS 2803 list of objects, and incrementing the reference count in DSS 2803. The source file 2802' current cloned-in-checkpoint number is recorded in the DSS 2809 root onode (step A4b). The current checkpoint number is recorded in the source object 2802' root onode (step A5). The handle of the data-stream-snapshot object 2809 is recorded in the source object 2802' metadata (step A6). A reference count and list of objects referencing the data-stream-snapshot object 2809 is recorded in the data-stream-snapshot object 2809 metadata (step A7). At this point, only the source object 2802' references the data-stream-snapshot object 2809, and the reference count is (temporarily) set to one.

Also as discussed above, the mutable file copy 2811 is created (step B1), and the block pointers from the data-stream-snapshot object 2809 root onode are copied to the object 2811 root onode (step B2). The current checkpoint number is recorded in the object 2811 root onode (step B3). The handle of the data-stream-snapshot object 2809 is recorded in the object 2811 metadata (step B4). The reference count in the data-stream-snapshot object 2809 is incremented and the handle of the object 2811 is recorded in the data-stream-snapshot object 2809 list of references (step B5).

It should be noted that the source object 2802' may be further modified over time, and clones of future versions of the object would result in additional data-stream-snapshot objects linked hierarchically with the first DSS 2803 and second DSS 2809. Similarly, clone 2805 and/or cline 2807 may be modified over time, and copies of those clones (both unmodified and modified) may be made from time to time substantially as described above, with additional DSS objects added hierarchically as needed. Cloning of unmodified object 2805 is substantially the same as cloning of the unmodified source object 2802, which would result in another mutable clone linked to the first DSS object 2803, whereas cloning of a modified version of object 2805 would result in creation of a mutable copy of the modified object linked to a new DSS that in turn is linked to the first DSS object 2803.

Figure 29:
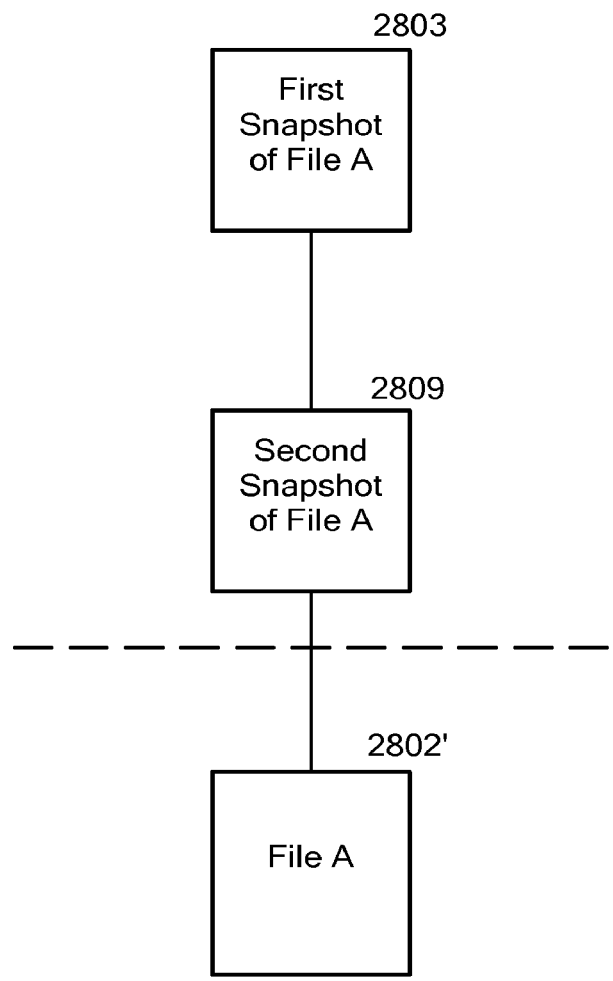
FIG. 29 schematically shows how DSS objects associated with a particular source object remain in the filesystem until the source object and all copies are deleted, in accordance with an exemplary embodiment of the present invention.

In an exemplary embodiment, the DSS objects associated with a particular source object remain in the filesystem until the source object and all clones are deleted. Thus, for example, even if clones 2805, 2807, and 2811 shown in FIG. 27 are deleted, DSS 2803, DSS 2809, and object 2802' remain, as represented schematically in FIG. 29. In this example, the filesystem includes the current version of the object as well as the two prior snapshot versions. Unless and until the source object diverges significantly from the snapshot versions of the object, the objects should share many data and metadata blocks and therefore maintaining the snapshot objects should not consume much storage space. If necessary or desirable, the snapshot objects could be removed, for example, through a de-cloning operation that essentially restructures the object 2802' to appear as an original (i.e., uncloned) object and removes the DSS objects and frees up data and metadata blocks from the DSS objects that are not shared with the object 2802'. Some or all of these functions may be performed as "background" tasks.

It should be noted that the logic flows described above with reference to steps A1-A7 including steps A4a and A4b are used to demonstrate how the various objects are created and linked in an exemplary embodiment of the present invention. Implementationally, the optional steps A4a and A4b may be virtual steps in that common logic may be used for both an initial cloning and cloning a clone. For example, each root onode essentially includes an "up pointer" to refer to a hierarchically higher root onode. Initially, the up pointer in the source object is null because the source object does not refer to a hierarchically higher DSS object. When the source object is cloned, the common logic may copy the up pointer from the source object root onode into the newly created DSS object (i.e., the first DSS object) and then set the up pointer in the source object root onode to refer to the DSS object, and similarly may copy the current checkpoint number from the source object to the first DSS object and then record the current checkpoint number in the source object. The resulting up pointers are represented in FIG. 24. The source object may then be modified. When the modified source object is cloned, the common logic may copy the up pointer from the modified source object (which refers to the first DSS object) to the newly created second DSS object and then set the up pointer in the modified source object to refer to the second DSS object, and similarly may copy the checkpoint number from the modified object to the second DSS object and record the current checkpoint number in the modified object. The resulting up pointers are represented in FIG. 28. Thus, such common code effectively does not need to distinguish between cloning an uncloned file and cloning a cloned file, and such common code will create any number of hierarchical levels of linking. A particular advantage of such common code is ease of implementation in a hardware-based filesystem.

In the exemplary embodiments described above, the DSS object is linked to the source object and clone object(s), and vice versa, using the file handles associated with the various objects. Among other thing, such linking allows the storage system controller to quickly identify whether a particular file has been cloned and also to locate objects associated with a cloned file. It should be noted that the present invention is not limited to the use of file handles to link the root onodes. Rather, other information, such as object numbers, could be used in addition to, or in lieu of, file handles.

It should be noted that in exemplary embodiments, the size attributed to a cloned file is the size of the source file from which the clone was created. Thus, for example, cloning a 1 Gbyte file will result in 1 Gbyte being charged to the quotas associated with the cloned file. Quotas do not take into account any block sharing between clone files.

In terms of performance, reading and writing to a clone object should be in line with that of reading and writing regular non-clone files. As with non-cloned files, the hardware-based filesystem can auto-inquire and auto-respond NFS/CIFS operations against cloned files. Client-side deletion of a cloned file (e.g., using the "rm" command) can be completed immediately, with actual removal of the cloned file and DSS objects performed in the background.

It should be noted that a clone object may be "owned" by a different user and group and may be located in a different directory tree than the source object and other clones.

It should be noted that the file cloning structures described above are used for managing the files within the filesystem and do not affect how the file is accessed outside of the filesystem. As with non-cloned files, transfer of a cloned file (e.g., HSR/NDMP) transfers the entire file contents, resulting in a "fat" file at the destination.

It should be noted that the cloning logic described above is preferably implemented predominantly in hardware as part of the hardware-based filesystem, in exemplary embodiments of the invention.

De-Cloning Cloned Objects

As discussed above, in an exemplary embodiment, the DSS objects associated with a particular source object remain in the filesystem until the source object and all clones are deleted. Unless and until the source object diverges significantly from the snapshot versions of the object, the objects should share many data and metadata blocks and therefore maintaining the snapshot objects should not consume much storage space. If necessary or desirable, the snapshot objects could be removed, for example, through a de-cloning operation that essentially restructures the object to appear as an original (i.e., uncloned) object and removes the DSS objects and frees up data and metadata blocks from the DSS objects that are not shared with the object. Some or all of these functions may be performed as "background" tasks.

In an exemplary embodiment, such "de-cloning" is performed as follows. When a DSS object's reference count becomes one (as in FIG. 29), and the surviving reference is a clone (not another DSS object), the clone may be "de-cloned" from the DSS object and the DSS object may be deleted.

In exemplary embodiments, such "de-cloning" is performed by transferring ownership of user data blocks from a DSS to its last-surviving live-file mutable clone. In this regard, an object (DSS or mutable clone) is deemed to own a block if the block pointer's checkpoint number is greater than or equal to the object's cloned-in-checkpoint number (where ownership means responsibility for freeing). Ownership of a shared user data block may be transferred to the live-file by:
1. Making the live-file's block pointer's checkpoint number:
   a. Greater than or equal to the live-file's cloned-in-checkpoint number.
   b. And less than the file system's current CP number (e.g., to ensure the block is preserved, for consistency-on-crash, if it is subsequently modified in the current checkpoint).
2. Making the DSS's block pointer sparse.

In exemplary embodiments, in order to meet the conditions in step 1, the live-file's cloned-in-checkpoint number is used. A checkpoint is issued before altering any block pointers to ensure the cloned-in-checkpoint number is less than the file system's current CP number.

In exemplary embodiments, the order of these two steps is important, as the update to the DSS will potentially free some of the onodes it owns (and may have been sharing with the live-file, prior to step 1).

FIG. 30 (comprising sub-parts 30A-30C) is used to demonstrate various aspects of file de-cloning, in accordance with exemplary embodiments of the present invention.

Figure 30A:
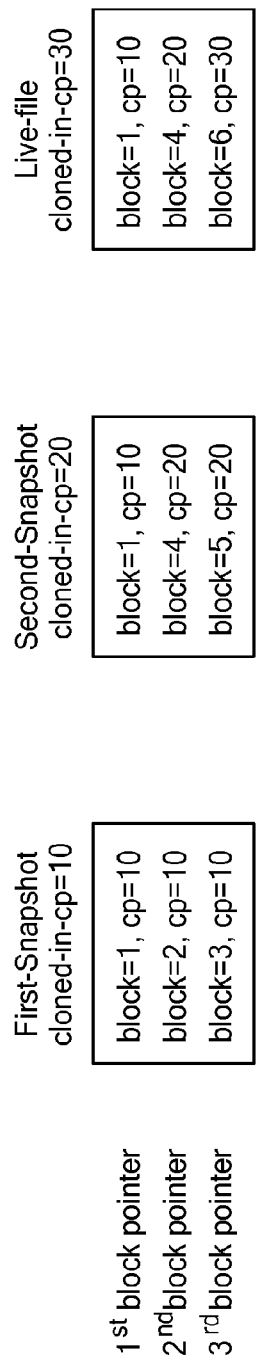
FIG. 30 (consisting of sub-parts 30A-30C) schematically shows object de-cloning in accordance with an exemplary embodiment.

FIG. 30A schematically shows a chain of objects, depicting the first three block pointers in each object's root onode.

Specifically, the First-Snapshot object has cloned-in-checkpoint number 10. Its block pointers point respectively to data stored in blocks 1-3.

The Second-Snapshot object has cloned-in-checkpoint number 20. It (still) shares its first block with the First-Snapshot object. Its second and third blocks have diverged, so its second and third block pointers now point respectively to data stored in blocks 4 and 5.

The Live-file object has cloned-in-checkpoint number 30. It shares its first block with the First-Snapshot and Second-Snapshot objects, and shares its second block with the Second-Snapshot object. Its third block has diverged, so its third block pointer now points to data stored in block 6.

Figure 30B:
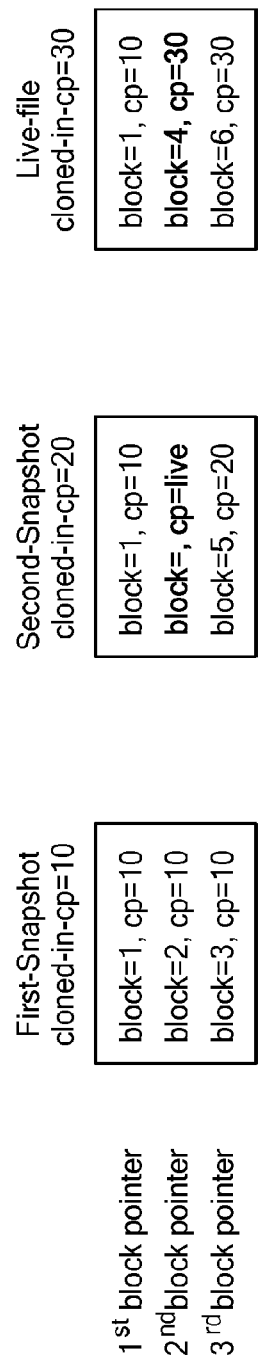
Figure 30C:

If the reference count of the Second-Snapshot object (i.e., the parent DSS object) drops to one, then ownership of the user data blocks it owns and shares with the Live-file object can be transferred to the Live-file object by atomically changing the corresponding block pointers. Specifically, for each data block owned by the DSS object and shared with the Live-file object, the corresponding block pointer in the DSS object is made "sparse" (which, as discussed more fully below, updates the block pointer's checkpoint number), and the checkpoint number associated with the corresponding block pointer in the Live-file object is updated to the cloned-in-checkpoint number of the Live-file object. FIG. 30B schematically depicts transfer of ownership of block 4 from the Second-Snapshot object (i.e., the DSS object) to the Live-file object. Specifically, Second-Snapshot's pointer to block 4 is made "sparse," and the checkpoint number of Live-file's pointer to block 4 is updated to the cloned-in-checkpoint number of the Live-file object.

These transformations are performed following the usual rules for preserving modified onodes. Specifically, whenever a block pointer is updated, the checkpoint number associated with the block pointer is updated to the current checkpoint number. Because the block pointer has been modified, the containing onode is written to new space. If that onode is a direct or indirect onode, then the block pointer to that onode in the parent onode is also updated such that the parent onode is modified and written to new space, and so on, until the root onode is processed. At the end of the transfer-of-ownership process, the Live-file object and the DSS object no longer share any onodes.

Thus, in an exemplary embodiment, in order to transfer ownership of shared blocks from the DSS object to the Live-file object, the Live-file object is traversed, and for each region found that is shared and owned by the DSS object, the associated block pointers in the Live-file object are "touched" (which updates the checkpoint number of the affected block pointers, similar to updating the checkpoint number when the corresponding block is written but without any data actually being written, so that the Live-file object now owns these blocks), and the associated block pointers in the DSS object are made sparse (which makes the affected block pointers point at nothing and also updates the checkpoint number, in effect creating a "hole" in the DSS object, so that when the DSS object is finally deleted, it no longer points to the user data blocks that were transferred to the Life-file object). The DSS object can be safely deleted once the block pointers for all shared user data blocks formerly owned by the DSS object have been transformed in this fashion.

With reference again to FIG. 30B, before the deletion of the Second-Snapshot object is started, the Live-file object is removed from the Second-Snapshot object's references list and is added to the First-Snapshot object's references list, thereby making the First-Snapshot object the parent DSS of the Live-file object. If and when the reference count for the First-Snapshot object reaches one (i.e., such that the Live-file object is First-Snapshot's only child), then the First-Snapshot object may be de-cloned as discussed above. For example, as depicted schematically in FIG. 30C, ownership of block 1 is transferred from the First-Snapshot object to the Live-file object. After ownership of all blocks owned by the First-Snapshot object and shared with the Live-file object have been transferred, the First-Snapshot object can be removed.

In exemplary embodiments, the "de-cloning" process copes with the Live-file being concurrently changed, by transferring ownership of a limited number of user data blocks at a time while the Live-file is held locked. Also, if the Live-file is cloned during this process, the process is aborted. This "de-cloning" process potentially "dirties" many indirect/direct onodes, but no user data blocks. One beneficial by-product, though, is that it leaves the Live-file's previously shared onodes with the "correct" object-number and reuse count. After deleting all of Live-file's predecessor DSS objects, Live-file may be converted back into a regular (non-clone) file.

Miscellaneous

It should be noted that the term "server" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM, a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A computer program product comprising a tangible, non-transitory computer-readable medium having embodied therein a computer program adapted to cause a processing unit of a storage apparatus to execute a method for managing a file system, the file system comprising (a) a first object which includes one or more first pointers referencing one or more data blocks and (b) a second object which includes one or more second pointers referencing one or more data blocks, the computer program including instructions that, when run on the processing unit of the storage apparatus, causes the processing unit to perform processes comprising:

forming a relationship between at least one data block of the one or more data blocks, which is owned by the first object and referenced by the one or more first pointers, and which is also referenced by the one or more second pointers;

transferring, for the at least one data block, ownership of the at least one data block from the first object to the second object; and removing the first object from the file system subsequent to such transfer of ownership from the first object to the second object.

2. The computer program product according to claim 1, wherein: ownership of an owned data block indicates a responsibility for freeing the owned data block.

3. The computer program product according to claim 1, wherein the second object is associated with a cloned-in-checkpoint number (CCN) and each pointer of the one or more second pointers is associated with a respective checkpoint number (CN); and transferring ownership of a respective data block from the first object to the second object comprises:

setting a checkpoint number (CN) associated with a pointer of the one or more second pointers which references the respective checkpoint a value being greater or equal to the cloned-in-checkpoint number (CCN) associated with the second object and being less than a current checkpoint number of the file system; and making the one or more first pointers of the first object sparse.

4. The computer program product according to claim 3, wherein:

the first object is associated with another cloned-in-checkpoint number (CCN) and each pointer of the one or more first pointers is associated with a respective checkpoint number (CN).

5. The computer program product according to claim 3, wherein an object owns a data block if the object includes a pointer, which references the respective data block, being associated with a checkpoint number which is greater than or equal to a cloned-in-checkpoint number associated with the object.

6. The computer program product according to claim 3, wherein:

the cloned-in-checkpoint number associated with the second object indicates an earliest checkpoint of the file system from which data of the second object can diverge from data of the first object.

7. The computer program product according to claim 1, wherein:
the second object is linked to the first object, and the first object is linked to another first object, and
upon removing the first object from the file system, the second object is linked to the other first object.

8. The computer program product according to claim 1, wherein:
such transfer of ownership from the first object to the second object and removing the first object is performed when it is determined that a reference count of the first object becomes one.

9. The computer program product according to claim 8, wherein:
a reference count of the first object becomes one when another second object being linked to the first object is deleted, the other second object being previously created as a clone of the second object.

10. The computer program product according to claim 9, wherein:
the other second object is associated with another cloned-in-checkpoint number indicating an earliest checkpoint of the file system from which data of the other second object can diverge from data of the first object and the data of the second object.

11. The computer program product according to claim 1, wherein:
the second object is a writable file of the file system.

12. The computer program product according to claim 1, wherein
the first object is a hidden second object of the file system.

13. The computer program product according to claim 1, wherein:
the first object is a read-only second object of the file system.

14. An apparatus for managing a file system, the apparatus comprising:
a storage system configured to store objects of the file system comprising a first object which includes one or more first pointers referencing one or more data blocks, and a second object which includes one or more second pointers referencing one or more data blocks; and
a processing unit configured to:
form a relationship between at least one data block of the one or more data blocks, which is owned by the first object and referenced by the one or more first pointers, and which is also referenced by the one or more second pointers;
transfer, for the at least one data block, ownership of the at least one data block from the first object to the second object; and
remove the first object from the file system subsequent to such transfer of ownership from the first object to the second object.

15. The computer program product according to claim 14, wherein:
ownership of an owned data block indicates a responsibility for freeing the owned data block.

16. The computer program product according to claim 14, wherein the second object is associated with a cloned-in-checkpoint number (CCN) and each pointer of the one or more second pointers is associated with a respective checkpoint number (CN); and
transferring ownership of a respective data block from the first object to the second object comprises:
setting a checkpoint number (CN) associated with a pointer of the one or more second pointers which references the respective checkpoint a value being greater or equal to the cloned-in-checkpoint number (CCN) associated with the second object and being less than a current checkpoint number of the file system; and
making the one or more first pointers of the first object sparse.

17. The computer program product according to claim 16, wherein:
the first object is associated with another cloned-in-checkpoint number (CCN) and each pointer of the one or more first pointers is associated with a respective checkpoint number (CN).

18. The computer program product according to claim 16, wherein an object owns a data block if the object includes a pointer, which references the respective data block, being associated with a checkpoint number which is greater than or equal to a cloned-in-checkpoint number associated with the object.

19. The computer program product according to claim 16, wherein:
the cloned-in-checkpoint number associated with the second object indicates an earliest checkpoint of the file system from which data of the second object can diverge from data of the first object.

20. The computer program product according to claim 14, wherein:
the second object is linked to the first object, and the first object is linked to another first object, and
upon removing the first object from the file system, the second object is linked to the other first object.

* * * * *